(12) United States Patent
Lee et al.

(10) Patent No.: US 12,021,757 B2
(45) Date of Patent: Jun. 25, 2024

(54) BANDWIDTH CONTROL INSIDE A SHARED NETWORK INTERFACE CARD

(71) Applicant: Oracle International Corporation, Redwood Shores, CA (US)

(72) Inventors: Kent Lee, Ladera Ranch, CA (US); Qiang Wang, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/698,987

(22) Filed: Mar. 18, 2022

(65) Prior Publication Data

US 2023/0300081 A1    Sep. 21, 2023

(51) Int. Cl.
*H04L 47/62* (2022.01)
*H04L 47/22* (2022.01)
*H04L 47/25* (2022.01)
*H04L 47/33* (2022.01)

(52) U.S. Cl.
CPC .......... *H04L 47/623* (2013.01); *H04L 47/225* (2013.01); *H04L 47/25* (2013.01); *H04L 47/33* (2013.01); *H04L 47/6225* (2013.01)

(58) Field of Classification Search
CPC ......... H04L 47/62; H04L 47/25; H04L 47/22; H04L 47/33; H04L 47/625; H04L 47/624; H04L 65/61; H04L 65/1023; H04L 65/65; H04L 65/80; H04L 65/612; H04L 12/741; H04L 12/873; H04L 45/74; H04L 49/508; H04L 29/06; H04L 29/08; H04L 12/803; H04L 12/801; G06F 11/20; G06F 11/07; G06F 9/455

USPC ......................................................... 370/230
See application file for complete search history.

(56) References Cited

U.S. PATENT DOCUMENTS

| | | | | |
|---|---|---|---|---|
| 6,049,546 | A * | 4/2000 | Ramakrishnan | ...... H04L 49/108 370/417 |
| 7,330,430 | B2 * | 2/2008 | Lodha | ..................... H04L 47/10 370/230.1 |
| 7,580,355 | B2 * | 8/2009 | Zhao | ....................... H04L 47/50 370/230.1 |
| 7,787,359 | B2 * | 8/2010 | He | .......................... H04L 47/10 370/242 |

(Continued)

*Primary Examiner* — Man U Phan
(74) *Attorney, Agent, or Firm* — Kilpatrick Townsend & Stockton LLP

(57) ABSTRACT

A smart network interface card (smartNIC) may receive first traffic for a first process configured with a first bandwidth limit. The smartNIC may receive second traffic for a second process configured with a second bandwidth limit, the second bandwidth limit corresponding to a larger value between a second transmit limit and a second receive limit associated with the second process. The smartNIC may queue the received traffic associated with the first process and the second process in a scheduler, the scheduler having a first set of queues configured to store traffic from the first process, and a second set of queues configured to store traffic from the second process. The smartNIC may forward queued traffic from the first set of queues or the second set of queues, a maximum amount of forwarded first process traffic corresponding to the first bandwidth limit minus an amount of forwarded second process traffic.

20 Claims, 23 Drawing Sheets

(56) References Cited

U.S. PATENT DOCUMENTS

| | | | |
|---|---|---|---|
| 8,223,767 B2* | 7/2012 | Nanda | H04L 47/15 370/390 |
| 8,817,619 B2* | 8/2014 | Lai | H04L 47/2433 370/231 |
| 10,298,495 B2* | 5/2019 | Tang | H04L 47/522 |
| 10,523,553 B2* | 12/2019 | Park | H04L 45/12 |
| 10,887,245 B2* | 1/2021 | Qureshi | H04L 43/0894 |
| 11,374,609 B2* | 6/2022 | Lee | H04B 1/0053 |
| 11,444,996 B2* | 9/2022 | Augé | H04L 65/61 |
| 2017/0070912 A1* | 3/2017 | Kozat | H04W 16/14 |
| 2017/0230296 A1* | 8/2017 | Kim | H04L 69/22 |
| 2022/0206908 A1* | 6/2022 | Brar | G06F 11/2005 |
| 2022/0311703 A1* | 9/2022 | K | H04L 45/70 |
| 2022/0353197 A1* | 11/2022 | Singh | H04L 47/625 |
| 2023/0029796 A1* | 2/2023 | Li | H04L 65/40 |
| 2023/0032441 A1* | 2/2023 | Singh | H04L 45/74 |

\* cited by examiner

BANDWIDTH CONTROL INSIDE A SHARED NETWORK INTERFACE CARD

BACKGROUND

Bandwidth in a network interface card can be set as fixed capacities for individual processes. However, fixed network capacities can mean that available bandwidth can go unused because available bandwidth is reserved for rare worst-case scenarios.

BRIEF SUMMARY

In some aspects, a method for sharing bandwidth on a smart network interface card (smartNIC) includes receiving first traffic for a first process configured with a first bandwidth limit. The first traffic is received by one or more processors of the smart network interface card, and the first bandwidth limit corresponds to a sum of a first transmit limit and a first receive limit associated with the first process. The method includes receiving second traffic for a second process configured with a second bandwidth limit. The bandwidth is received by one or more processors of the smart network interface card, and the second bandwidth limit corresponds to half the sum of a second transmit limit and a second receive limit associated with the second process. The method includes queuing the received traffic associated with the first process and the second process in a scheduler. The traffic is queued by one or more processors of the smart network interface card. The scheduler has a first set of queues configured to store traffic from the first process, and a second set of queues configured to store traffic from the second process. The method includes forwarding queued traffic from the first set of queues or the second set of queues. A maximum amount of forwarded first process traffic corresponding to the first bandwidth limit minus the amount of forwarded second process traffic, and the forwarding is performed by one or more processors of the smart network interface card.

In some aspects, traffic is forwarded according to a fair weighted round robin algorithm. The fair weighted round robin includes assigning a weight to packets corresponding to packet size.

In some aspects, the first process comprises one or more subprocesses and the second process comprises one or more subprocesses.

In some aspects, a subset of the first traffic is received through a pipeline where pipeline traffic is controlled by a rate limiter. The rate limiter can limit traffic based on a first global limit for traffic from the first process.

In some aspects, the subset includes communication sent to open a connection with the first process and communication sent to close a connection with the first process.

In some aspects, the subset is configured with a subset bandwidth limit.

In some aspects, the second traffic received from the second process is controlled by a rate limiter. The rate limiter can limit traffic based on a second global limit for traffic from the second process.

In some aspects, a computer-readable storage medium storing a set of instructions includes receiving first traffic for a first process configured with a first bandwidth limit. The first traffic is received by one or more processors of the smart network interface card, and the first bandwidth limit corresponds to a sum of a first transmit limit and a first receive limit associated with the first process. The instructions include receiving second traffic for a second process configured with a second bandwidth limit. The bandwidth is received by one or more processors of the smart network interface card, and the second bandwidth limit corresponds to half the sum of a second transmit limit and a second receive limit associated with the second process. The instructions include queuing the received traffic associated with the first process and the second process in a scheduler. The traffic is queued by one or more processors of the smart network interface card. The scheduler has a first set of queues configured to store traffic from the first process, and a second set of queues configured to store traffic from the second process. The instructions include forwarding queued traffic from the first set of queues or the second set of queues. A maximum amount of forwarded first process traffic corresponding to the first bandwidth limit minus the amount of forwarded second process traffic.

In some aspects, an smart network interface card (smartNIC) includes: memory storing computer-executable instructions; and one or more processors configured to access the memory, and execute the computer-executable instructions to at least: receive first traffic for a first process configured with a first bandwidth limit. The first traffic is received by one or more processors of the smart network interface card, and the first bandwidth limit corresponds to a sum of a first transmit limit and a first receive limit associated with the first process. The instructions cause the processors to receive second traffic for a second process configured with a second bandwidth limit. The second bandwidth limit corresponds to half the sum of a second transmit limit and a second receive limit associated with the second process. The instructions cause the processors to queue the received traffic associated with the first process and the second process in a scheduler. The scheduler has a first set of queues configured to store traffic from the first process, and a second set of queues configured to store traffic from the second process. The instructions cause the processors to forward queued traffic from the first set of queues or the second set of queues. A maximum amount of forwarded first process traffic corresponding to the first bandwidth limit minus the amount of forwarded second process traffic.

DETAILED DESCRIPTION

Figure 1:
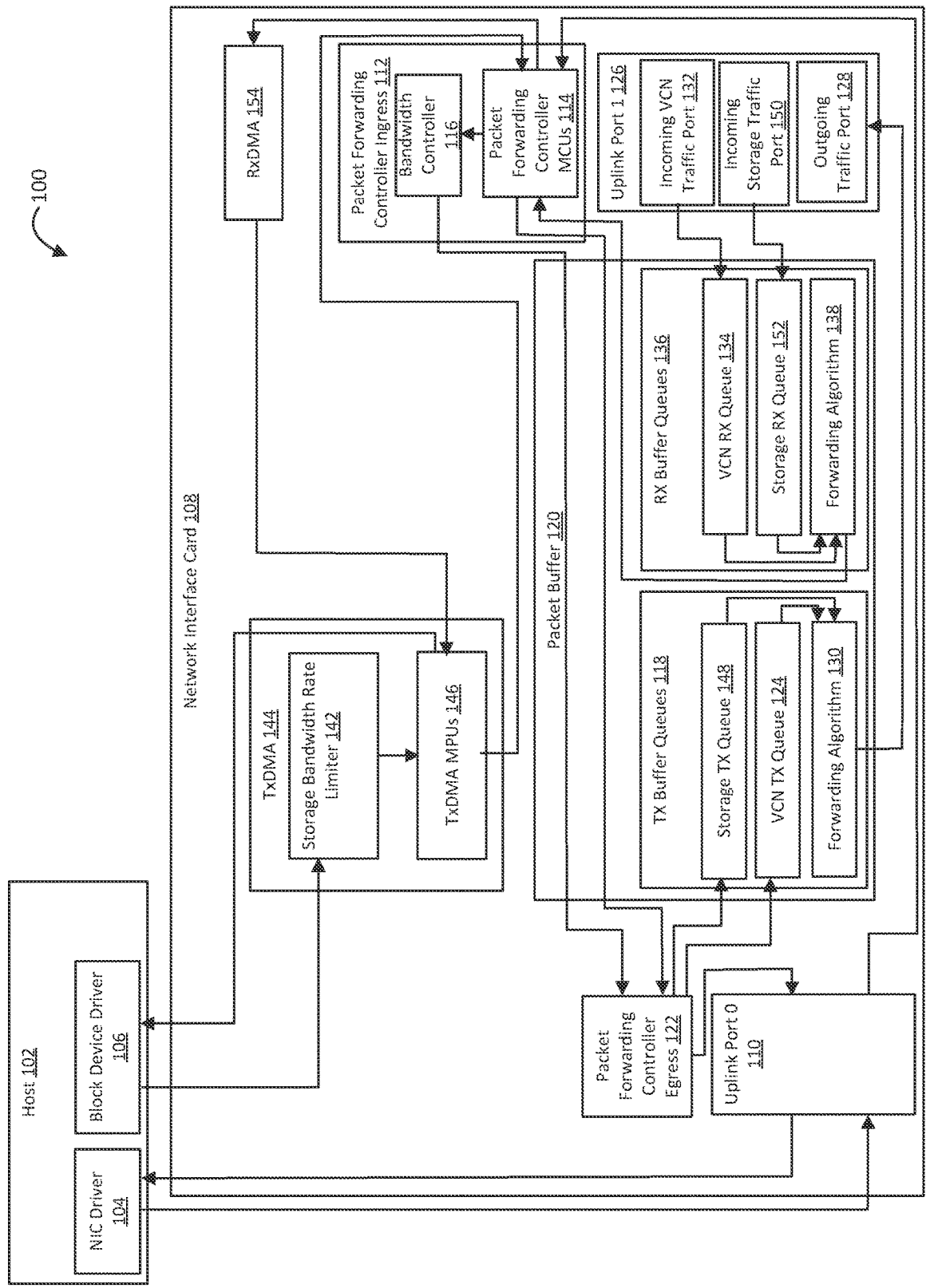
FIG. 1 is a system diagram showing the fast path pipeline 100 according to certain embodiments. The fast path pipeline 100 can be used for storage traffic and VCN traffic.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for setting flexible bandwidth limits for a network interface card (NIC) to allow for bandwidth fluctuations. In some implementations the NIC can be a smart network interface card (smartNIC). The bandwidth of a NIC is often configured as a set bandwidth for each process using the NIC regardless of the amount of traffic. In this configuration, processes are denied available capacity because bandwidth is reserved for rare worst-case scenarios. Flexible NIC bandwidth limits can allow processes to use available network resources without starving a process of bandwidth during a worse-case scenario.

A flexible bandwidth limit can include setting an upper limit for the amount of bandwidth that a process can use. While a single process cannot exceed its bandwidth, if that service is not using its full bandwidth allotment other processes receiving traffic from the NIC can use the leftover bandwidth. For instance, a process can have one combined bandwidth limit for both transmitting and receiving traffic or the process can have a separate bandwidth for transmitting traffic and a separate bandwidth limit for receiving traffic. In some implementations, a combined bandwidth for transmitting and receiving messages can mean that if a process is using its entire bandwidth limit to transmit traffic, the process can have no bandwidth to receive traffic.

The bandwidth limit for a process can also be based on the amount of bandwidth used by another process. For example, a first process can have a transmit bandwidth limit for sending traffic. The transmit bandwidth limit can be set so that the first process can send a maximum amount of traffic if no other processes are transmitting messages. If a second process sends traffic, the available bandwidth that the first process can use to transmit traffic can be the first process's transmit bandwidth limit minus the bandwidth of traffic transmitted by the second process.

In an illustrative example, a first process can have a bandwidth limit with a separate transmit limit and a separate receive limit. The transmit limit can represent an amount of network capacity that is reserved for transmitting traffic sent by the first process. The receive limit can represent an amount of network capacity that is reserved for receiving traffic from the first process. The transmit limit and the receive limit are separate because the amount of network capacity that can be used to transmit traffic is not limited by the amount of network capacity that is being used to receive traffic.

A second process can have a bandwidth limit with a duplex limit representing a combined transmit and receive limit. The second process has a duplex limit because the second process is only capable of sending or receiving a combined amount of traffic at a time. If the second process uses all of its bandwidth limit to transmit traffic, the second process will not be able to receive traffic. If the second process uses all of its bandwidth to receive traffic, the second process will not be able to transmit traffic.

The first process and the second process send and receive traffic through a network interface card (NIC) with a 400 gbps duplex bandwidth with a 200 gbps transmit capacity and a 200 gbps receive capacity. The receive limit for the first process can be 200 gbps and the receive limit for the first process can be 200 gbps. The bandwidth for the second process can be 80 gbps. If the second process had a separate transmit limit and a separate receive limit, the second process's bandwidth limit would have to be twice as large to account for a worst-case scenario where the entire bandwidth is used to either transmit or receive.

The second process can transmit 60 gbps worth of traffic leaving 20 gbps of the first process' 80 gbps bandwidth available to receive traffic. The second process therefore uses 60 gbps of the network interface card's transmit limit and 20 gbps of the card's receive limit. The first process can transmit traffic on the remaining 140 gbps of the network interface card's transmit capacity to send traffic associated with the first process. The first process can also receive traffic on the remaining 180 gbps of the network interface card's receive limit. If the second process had a separate transmit limit and a separate receive limit, the first process would be limited to transmitting 120 gbps and receiving 120 gbps to account for worst-case scenarios. The worst-case scenarios would be if the second process uses its entire capacity to transmit or receive traffic. Assigning the second process a duplex limit allows 80 gbps of extra traffic to pass through the network interface card (NIC).

A. Fast Path Pipeline

FIG. 1 is a system diagram showing the fast path pipeline 100 according to certain embodiments. The fast path pipeline 100 can be used for virtual cloud network (VCN) traffic (e.g., first process traffic) and non-volatile memory (NVM) traffic (e.g., second process traffic). The fast path pipeline shows a connection from a host to the Internet via a network interface card (NIC).

Turning to fast path pipeline 100 in greater detail, the pipeline includes a host 102 and a network interface card (NIC) 108. Host 102 can contain a NIC driver 104 and a block device driver 106. Host 102 can be a hypervisor, bare metal, or virtual machine that can have one or more subnetworks (subnets). The NIC driver 104 and block device driver 106 can be configured to send and receive incoming VCN traffic from the NIC 108. The block device driver can be a non-volatile memory express driver or any other capable of accessing a storage. Outgoing traffic sent by the NIC driver 104 can originate from host 102 or a subnetwork (subnet) inside host 102. Incoming traffic received at NIC driver 104 from NIC 108 can be packets addressed for host 102 or a subnet inside host 102 that is received at NIC 108 from a local network or a public network. The bandwidth for incoming VCN traffic and outgoing VCN traffic can be separate so that, for example, the available bandwidth for incoming VCN traffic is independent of the amount of outgoing VCN traffic.

Storage traffic can allow host 102 to communicate with back-end memory such as flash memory. Storage traffic can be sent according to a specification for accessing a computer's non-volatile storage media (e.g., non-volatile memory express (NVMe)). Nonvolatile media can include solid-state drives (SSDs), PCI Express (PCIe) add-in cards, M.2 cards etc. The block device driver 106 can send outgoing storage traffic that can include requests for information stored in nonvolatile memory. Block device driver 106 can also receive traffic from nonvolatile memory including information stored in nonvolatile memory sent in response to a request from block device driver 106. The bandwidth for storage traffic can be the sum of incoming and outgoing traffic. For example, if block device driver 106 is sending the maximum amount of outgoing storage traffic, block device driver may not receive incoming traffic.

In some circumstances, the block device driver 106 can communicate with the SmartNIC 108 via peripheral component interconnect express (PCIe) (e.g., NVMe/PCIe). Once the SmartNIC receives the NVMe/PCIe requests, it can convert them to NVMe/transmission control protocol (TCP) requests. The converted requests can be sent over the network to a remote target. In some circumstances, VCN traffic can go through a host NIC via NIC driver 104.

NIC 108 can include one or more uplink ports including uplink port 0 110 and uplink port 1 126. The uplink ports can allow NIC 108 to connect to other networks. In one implementation, uplink port 0 110 can allow communication between host 102 and NIC 108 and uplink port 1 126 can allow NIC to communicate with private networks or public networks.

NIC 108 can also include packet forwarding controller egress 122 and packet forwarding controller ingress 112. Traffic leaving NIC 108 can be routed by packet forwarding controller egress 122 before reaching host 102, via uplink port 0 110, or a private network or public network, via uplink port 1 126. Traffic entering NIC 108 through uplink port 0 110 or uplink port 1 126, can be routed by packet forwarding controller ingress. Packet forwarding controller ingress 112, or packet forwarding controller egress 122, can also contain packet forwarding controller microprocessors (MPUs) 114 and bandwidth controller 116. Packet forwarding controller MPUs can route traffic to receive direct memory access (RxDMA) 154 or packet forwarding controller egress 122. Bandwidth controller 116 can limit VCN traffic at packet forwarding controller Ingress to the total permitted bandwidth for each VM if the VCN contains multiple VNs. If the total VM bandwidth is 10 gbps, the bandwidth controller for the VM can be set to 10 gbps to get more bandwidth to allow burstiness for VCN traffic.

NIC 108 can also include RxDMA 154 and a transmit direct memory access (TxDMA) 144. Direct memory access can allow hardware subsystems access to main system memory (e.g., random access memory) independent of the central processing unit (CPU). TxDMA can include a storage bandwidth limiter 142 and TxDMA MPUs 146. Storage bandwidth limiter 142 can include a bandwidth limit per VM and a global storage bandwidth limit. In some circumstances, the per VM bandwidth limit can limit the requests pulled from the NVMe submission queues for TxDMA 144 processing based on a bandwidth or a ratio of VCN traffic to storage traffic. For example, if VCN traffic to storage traffic ratio is 60/40 and the total VM bandwidth can be 10 gbps and the storage bandwidth rate limit for the VM can be set to 4 gbps.

Packet buffer 120 can be memory that stores packets received at NIC 108 or packets awaiting transmission from NIC 108. NIC 108 can include TX buffer queues 118 and RX buffer queues 136. TX buffer queues 118 can include a queue for storage traffic, storage TX queue 148, and a queue for VCN traffic, VCN TX queue 124. RX buffer queues 136 can contain a queue for VCN traffic, VCN RX queue 134, and a queue for storage traffic, storage RX queue 152. Traffic from TX buffer queues 118 and RX buffer queues can be forwarded using forwarding algorithms (e.g., forwarding algorithm 130 and forwarding algorithm 138). Forwarding algorithm 130, and forwarding algorithm 138, can be a weighted round robin algorithm. In a weighted round robin algorithm, traffic sources can be assigned different weights so that different amounts of requests can be processed for the traffic sources. For example, if VCN traffic is assigned a weight of 2 and storage traffic is assigned a weight of 3 then 60% of the forwarded packets will be for storage traffic. In some implementations, the weights for forwarding algorithm 130 and forwarding algorithm 138 can be different. The algorithms used in forwarding algorithm 130 and forwarding algorithm 138 can be different in some implementations.

Figure 2:
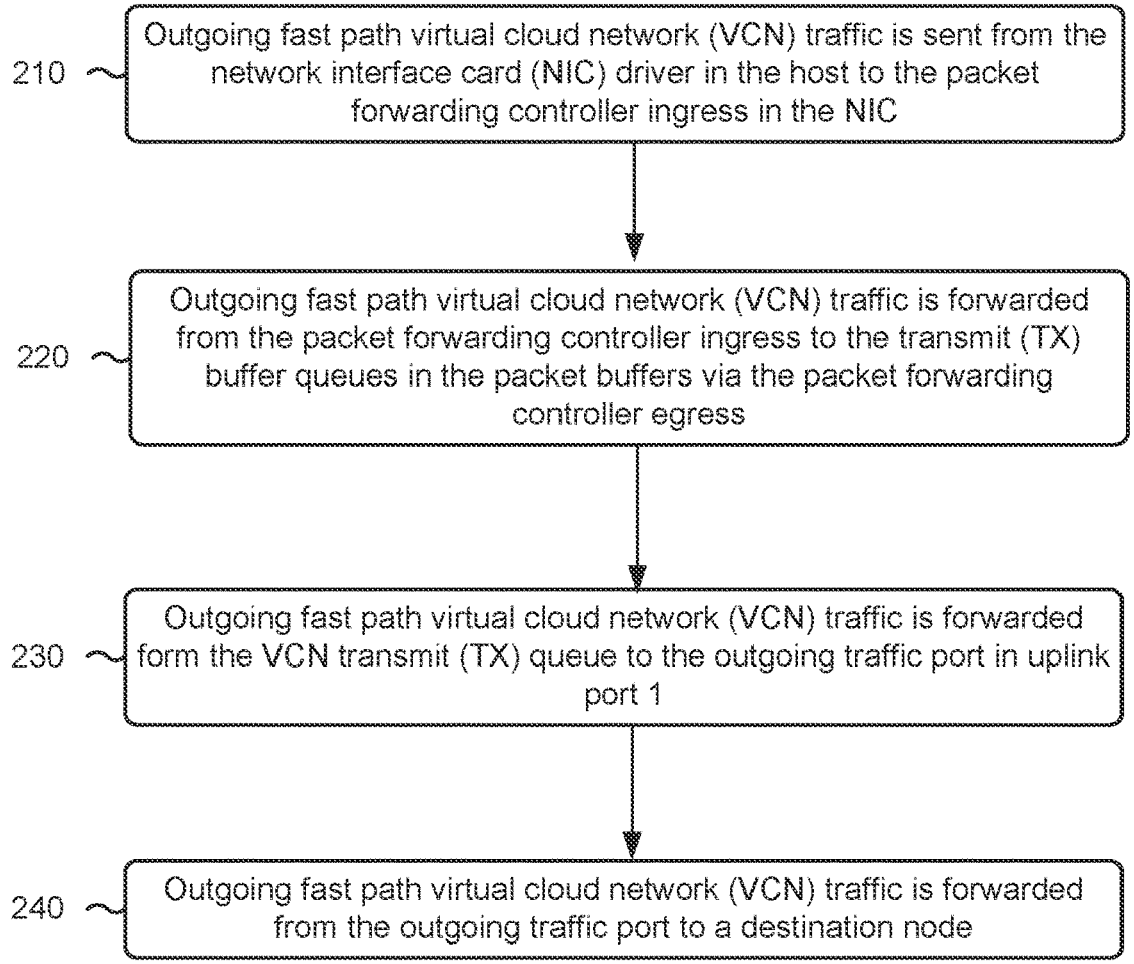
FIG. 2 shows a method 200 for sending outgoing VCN traffic from the host to a network using the fast path pipeline according to certain embodiments.

FIG. 2 shows a method 200 for sending outgoing virtual cloud network (VCN) traffic (e.g., first process traffic) from the host to a network using the fast path pipeline according to certain embodiments. The bandwidth available for outgoing VCN traffic is unconnected to the bandwidth available for incoming VCN traffic. If less than the maximum amount of outgoing storage traffic (e.g., second process traffic) bandwidth is being used, the unused storage traffic can be used for outgoing VCN traffic.

At block 210, outgoing VCN traffic, from one or more virtual machines (VMs), can be sent from NIC driver 104 in host 102 to the packet forwarding controller ingress 112 in NIC 108. NIC 108 can be a computer hardware component that connects a computer to a computer network. In some implementations, NIC 108 can be a smartNIC. The outgoing VCN traffic can be received at uplink port 0 110 before the outgoing VCN traffic is forwarded to packet forwarding controller ingress 112. Host 102 and uplink port 0 110 can be connected by a network cable. packet forwarding controller microcontrollers (MPUs) 114 in packet forwarding controller ingress 112 can process the received VCN traffic. In implementations where the VCN contains more than one virtual network (VNs e.g., subnets), the amount of VCN bandwidth allocated to traffic from each VM can be determined by the bandwidth controller 116.

At block 220, outgoing VCN traffic can be forwarded from the packet forwarding controller ingress 112 to transmit (TX) buffer queues 118 in the packet buffer 120 via the packet forwarding controller egress 122. Packet buffer 120 can store incoming and outgoing traffic traveling through the pipeline. The TX buffer queues 118 can be an element in packet buffer 120 that stores outgoing VCN traffic. The outgoing VCN traffic can be forwarded by packet forwarding controller MPUs 114 or bandwidth controller 116. The outgoing VCN traffic can be stored in the VCN queue 124 in the TX packet buffer queues 118.

At block 230, the outgoing VCN traffic can be forwarded from VCN TX queue 124 to the outgoing traffic port 128 in uplink port 1 126 using the forwarding algorithm 130. Forwarding algorithm 130 can be a weighted round robin algorithm. Forwarding algorithm 130 can limit the amount of VCN traffic that is transmitted based at least in part on the bandwidth limit for VCN traffic (e.g., first process bandwidth).

At block 240, the outgoing VCN traffic is forwarded from the outgoing traffic port to a destination node. The destination node can be another host that is connected to NIC 108 by a local network or a destination node on a public network.

Figure 3:
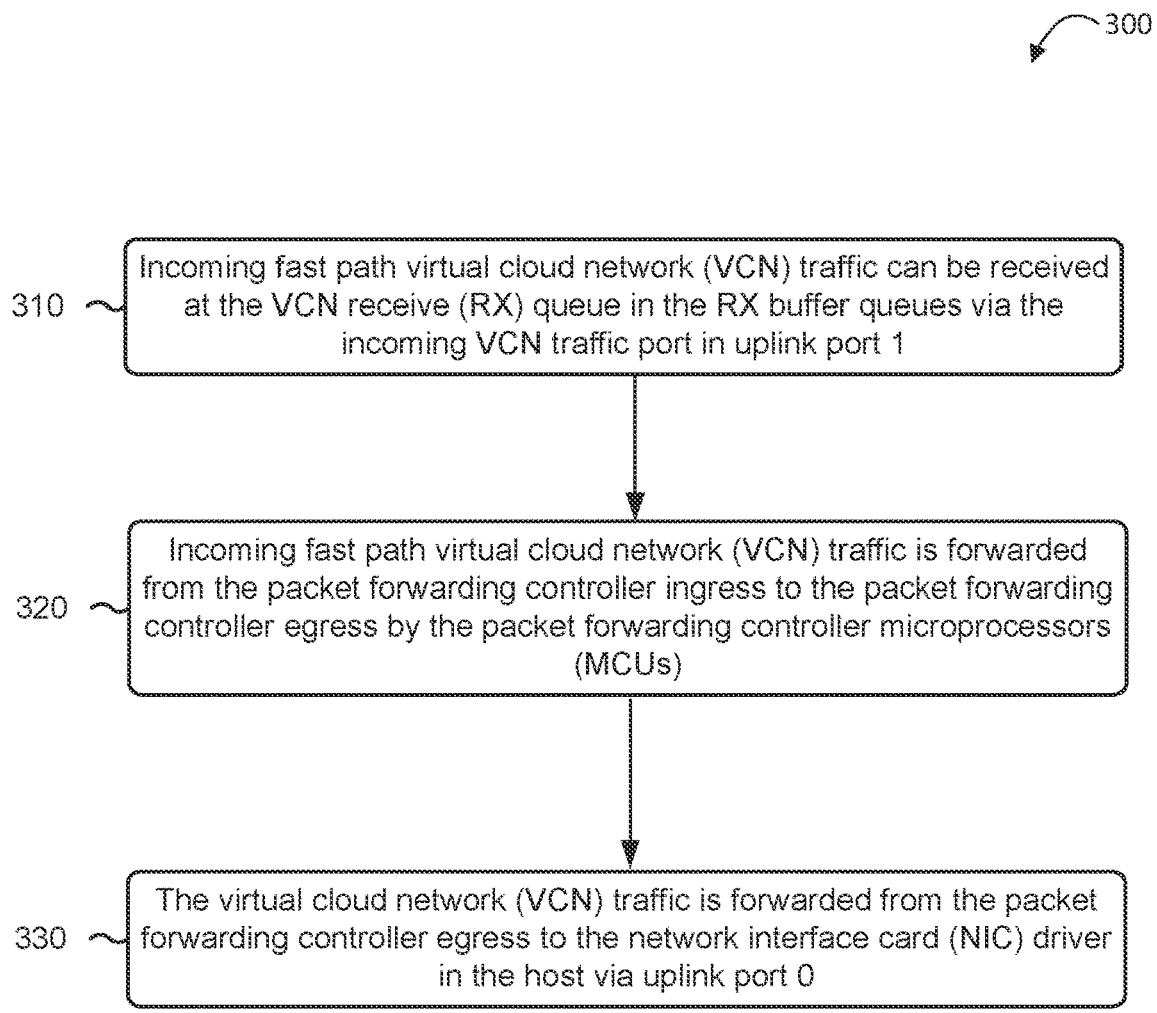
FIG. 3 shows a method 300 for receiving incoming VCN traffic using the fast path pipeline according to certain embodiments.

FIG. 3 shows a method 300 for receiving incoming virtual cloud network (VCN) traffic (e.g., first process traffic) using the fast path pipeline according to certain embodiments. The bandwidth available for incoming VCN traffic is unconnected to the bandwidth available for outgoing VCN traffic. If less than the maximum amount of incoming storage traffic (e.g., second process traffic) bandwidth is being used, the unused storage traffic can be used for incoming VCN traffic.

At block 310, incoming VCN traffic, coming from a source node, can be received at the VCN receive (RX) queue 134 of the RX buffer queues 136 via the incoming VCN traffic port 132. The source node can be located in a host connected to network interface card (NIC) 108 by a local network or the source node can be located in a public network. The incoming VCN traffic can be forwarded from the RX packet buffer queues 136 to packet forwarding controller MPUs in the packet forwarding controller ingress 112 via forwarding algorithm 138. RX packet buffer queues 136 can store incoming VCN traffic and forwarding algorithm 138 can limit the incoming VCN traffic so that the VCN bandwidth limit (e.g., first bandwidth limit) is maintained. In some implementations, forwarding algorithm 138 can be the same as forwarding algorithm 130. Forwarding algorithm 138 can be a weighted round robin algorithm.

At block 320, the incoming VCN traffic can be forwarded from packet forwarding controller ingress 112 to packet forwarding controller egress 122 by the packet forwarding controller microprocessors (MPUs) 114. In some implementations, the VCN traffic can be forwarded from the packet forwarding controller MPUs to the bandwidth controller 116. In implementations where the VCN contains more than one virtual network (e.g., subnets), bandwidth controller 116 can limit VCN traffic from each VN at packet forwarding controller Ingress 112 to the permitted bandwidth for the individual VMs.

At block 330, the incoming VCN traffic can be forwarded from packet forwarding controller egress 122 to uplink port 0 110 where the outgoing VCN traffic in the uplink port 0 110 can be forwarded to NIC driver 104 in host 102. Host 102 can be connected to uplink port by a network cable.

Figure 4:
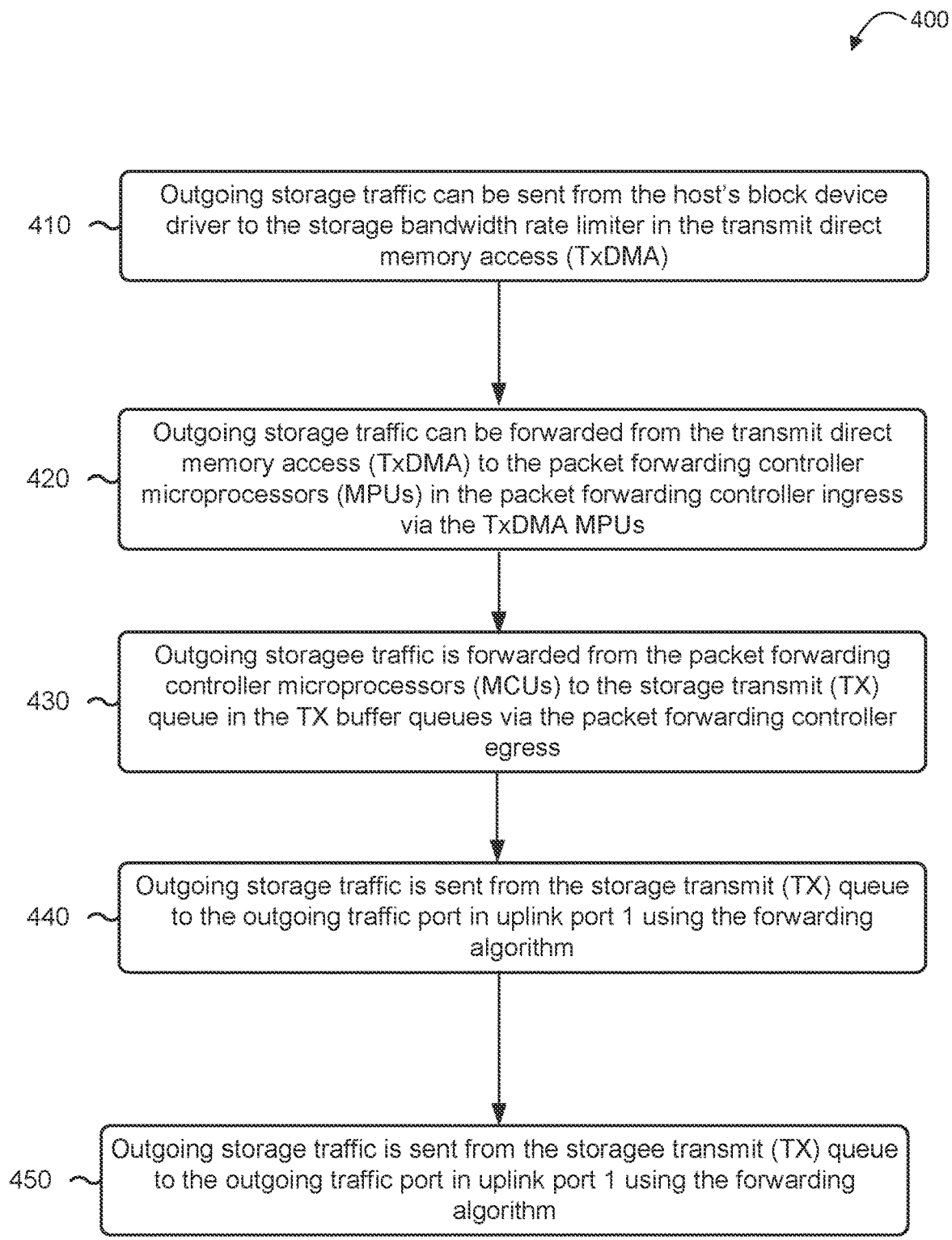
FIG. 4 shows a method 400 for sending outgoing storage traffic from the host to a network using the fast path pipeline according to certain embodiments.

FIG. 4 shows a method 400 for sending outgoing storage traffic (e.g., second process traffic) from the host to a network using the fast path pipeline according to certain embodiments.

At block 410, outgoing storage traffic can be received at the storage bandwidth rate limiter 142 in the transmit direct memory access (TxDMA) 144 from the block device driver 106 in host 102. In implementations where the host contains more than one virtual machine (VM), storage bandwidth rate limiter 142 can have a storage bandwidth limit per VM and a NVM global bandwidth limit. Direct memory access, such as TxDMA 144, can allow hardware subsystems access to main system memory (e.g., random access memory) independent of the central processing unit (CPU).

At block 420, outgoing storage traffic can be forwarded from the storage bandwidth rate limiter 142 to the TxDMA microprocessors (MPUs) 146. The storage traffic can be forwarded from the TxDMA MPUs 146 in the TxDMA 144 to packet forwarding controller MPUs 114 in the packet forwarding controller ingress 112.

At block 430, the outgoing storage traffic can be forwarded from packet forwarding controller MPUs 114 to the storage transmit (TX) queue 148 in TX buffer queues 118 via packet forwarding controller egress 122.

At block 440, the outgoing ack-end database traffic can be sent from storage TX queue 148 to outgoing traffic port 128 in uplink port 1 126 as outgoing network traffic using forwarding algorithm 130. Forwarding algorithm 130 can limit the outgoing storage traffic so that the storage bandwidth limit (e.g., second bandwidth limit) is maintained. In some implementations, forwarding algorithm 130 can be the same as forwarding algorithm 138. Forwarding algorithm 130 can be a weighted round robin algorithm.

At block 450, the outgoing storage traffic can be forwarded from outgoing traffic port to a destination node. The destination node can be located in a host machine connected to the NIC 108 via a local network or the destination node can be located in a public network.

Figure 5:
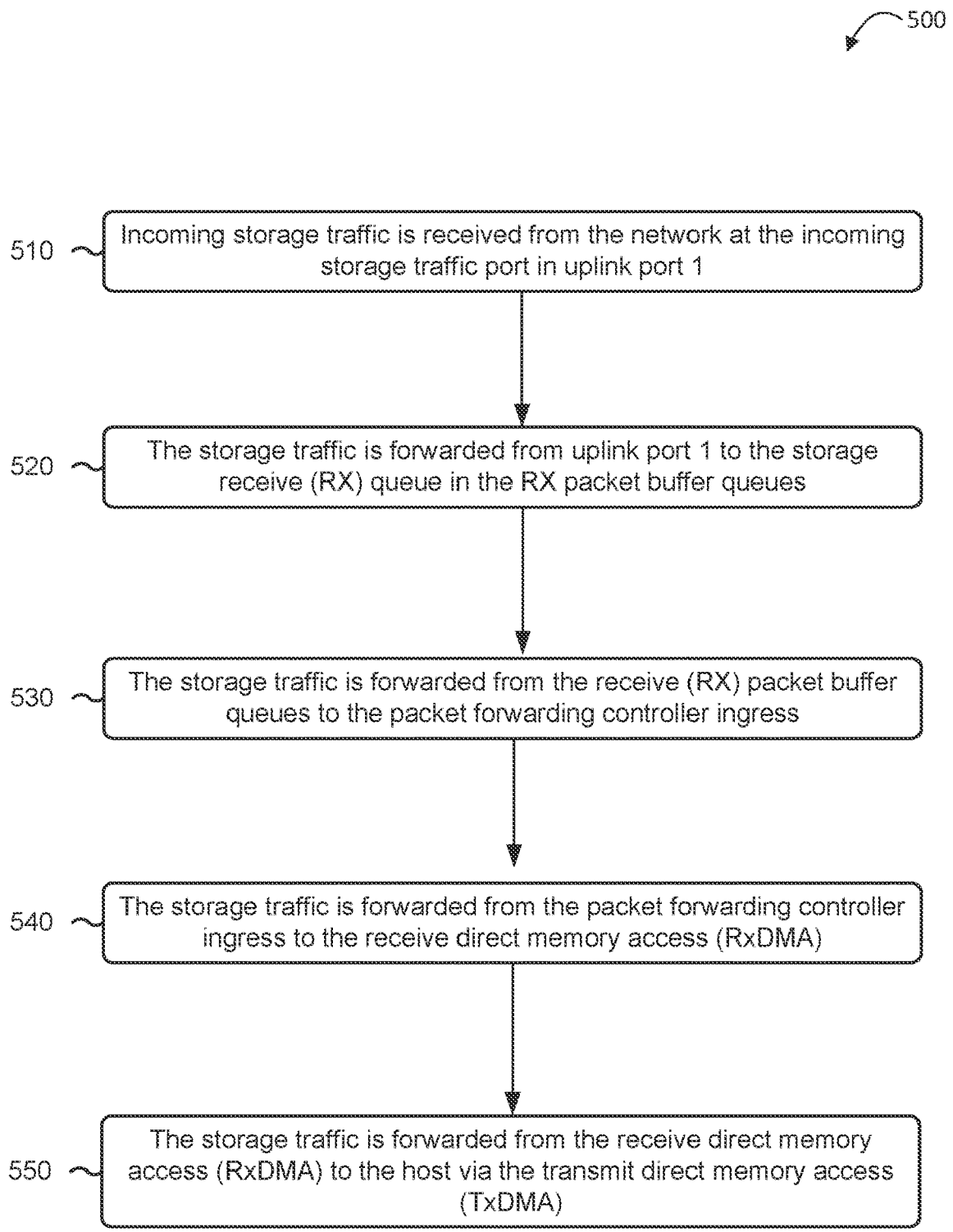
FIG. 5 shows a method 500 for receiving incoming storage traffic from the network at a host according to certain embodiments.

FIG. 5 shows a method 500 for receiving incoming storage traffic (e.g., second process traffic) from the network at a host according to certain embodiments.

At block 510, incoming storage traffic can be received from a destination node at the incoming storage traffic port 150 in uplink port 1 126.

At block 520, the incoming storage traffic can be forwarded to the storage receive (RX) queue 152 in the RX packet buffer queues 136 from uplink port 1 126. RX packet buffer queues 136 can store incoming storage traffic.

At block 530, the incoming storage traffic can be forwarded from the RX packet buffer queues 136 to packet forwarding controller microprocessors (MPUs) 114 in packet forwarding controller ingress 112 using forwarding algorithm 138. Forwarding algorithm 138 can limit the incoming storage traffic so that the storage bandwidth limit (e.g., second bandwidth limit) is maintained. In some implementations, forwarding algorithm 138 can be the same as forwarding algorithm 130. Forwarding algorithm 138 can be a weighted round robin algorithm.

At block 540, the incoming storage traffic can be forwarded from packet forwarding controller ingress by packet forwarding controller microprocessors (MPUs) 114 to the receive direct memory access (RxDMA) 154. Direct memory access, such as RxDMA 154, can allow hardware subsystems access to main system memory (e.g., random access memory) independent of the central processing unit (CPU).

At block 550, the incoming Storage traffic can be forwarded from RxDMA 154 to Block device driver 106 in host 102 by the transmit direct memory access (TxDMA) MPUs 146 in TxDMA 144.

B. Slow Path Pipeline

Figure 6:
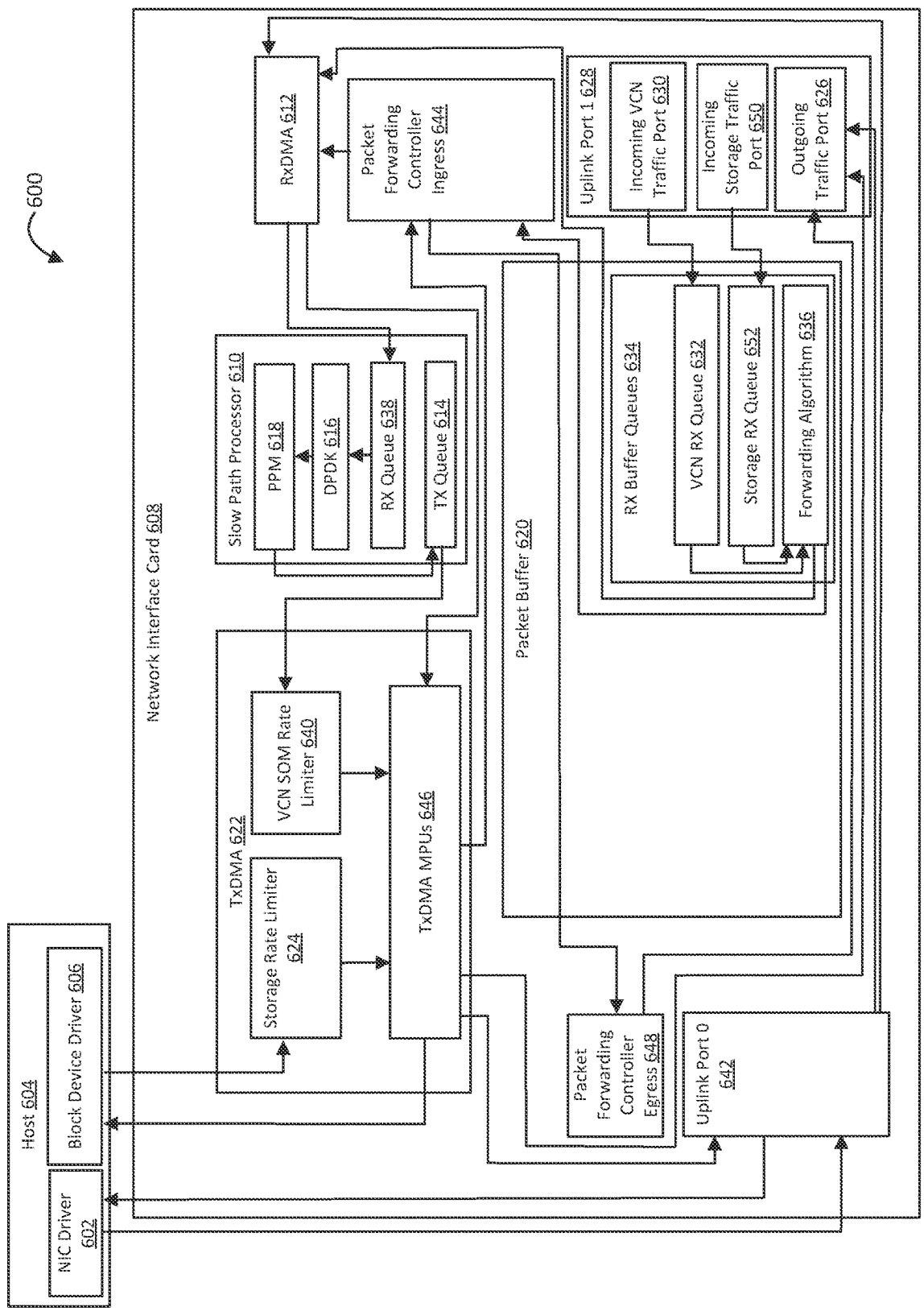
FIG. 6 shows a system diagram showing the slow path pipeline 600 according to certain embodiments.

FIG. 6 shows a system diagram showing the slow path pipeline 600 according to certain embodiments. Traffic can be sent using the slow path pipeline 600 during debugging sessions, during software upgrades. In some implementations, the packets to initiate and terminate communication can be sent via slow path pipeline 600. For example, SYN, SYN-ACK, ACK, FIN, FIN-ACK, ACK packets can be sent to initiate and terminate a connection using the slow path pipeline. In some implementations, slow path pipeline 600 can be used for virtual cloud network (VCN) traffic.

The slow path pipeline 600 architecture is similar to the fast path architecture disclosed in FIG. 1. Host 604 can be similar to host 102 disclosed in FIG. 2 in some implementations. The description of network interface card (NIC) 108 and its elements, described above, can also apply to similar elements found in network interface card 608 in FIG. 6. For instance, packet buffer 620 can be similar to packet buffer 120, packet forwarding controller egress 648 can be similar to packet forwarding controller egress 122 can be similar to packet forwarding controller egress 122, uplink port 0 642 can be similar to uplink port 0 110, and packet forwarding controller ingress 644 can be similar to packet forwarding controller ingress 112.

A difference between the slow path pipeline 600 and the fast path pipeline 100 can be the slow path processor 610. Packets arriving at slow path processor 610 can be received at the RX queue 638 and the packets can be transmitted from the TX queue 614 after passing through the data plane development kit (DPDK) 616 and packet processing module (PPM) 618 (e.g., core packet processor (CPP). The DPDK 616 and PPM can perform similar functions to those performed by the packet forwarding controller ingress 644 or the packet forwarding controller egress 648.

The transmission direct memory access (TxDMA) 622 in the slow path pipeline 600 can also include a VCN Skip-Offload Mode (SOM) rate limiter 640. Global VCN traffic through TxDMA 622 can be controlled using the VCN SOM rate limiter 640. Storage traffic through TxDMA 622 can be controlled using the storage bandwidth rate limiter 624. The bandwidth available for storage traffic can include bandwidth limits for each virtual machine as well as a global storage bandwidth limit.

In some implementations, the traffic through TxDMA 622 can be controlled by allocating TxDMA 622 processing power to VCN SOM rate limiter 640 and storage bandwidth rate limiter 624. For example, VCN traffic in the TxDMA 622 can be allocated 60% of the processing power and storage traffic can receive the remaining 40% of the processing power. If 60% of the processing power allows for 10 million packets per second (PPS) for VCN traffic, and 40% give 60 gbps BW for storage traffic, the VCN SOM rate limiter 640 limit can be set to 10 million packets per second and the storage bandwidth rate limit can be set to 60 gbps.

Figure 7:
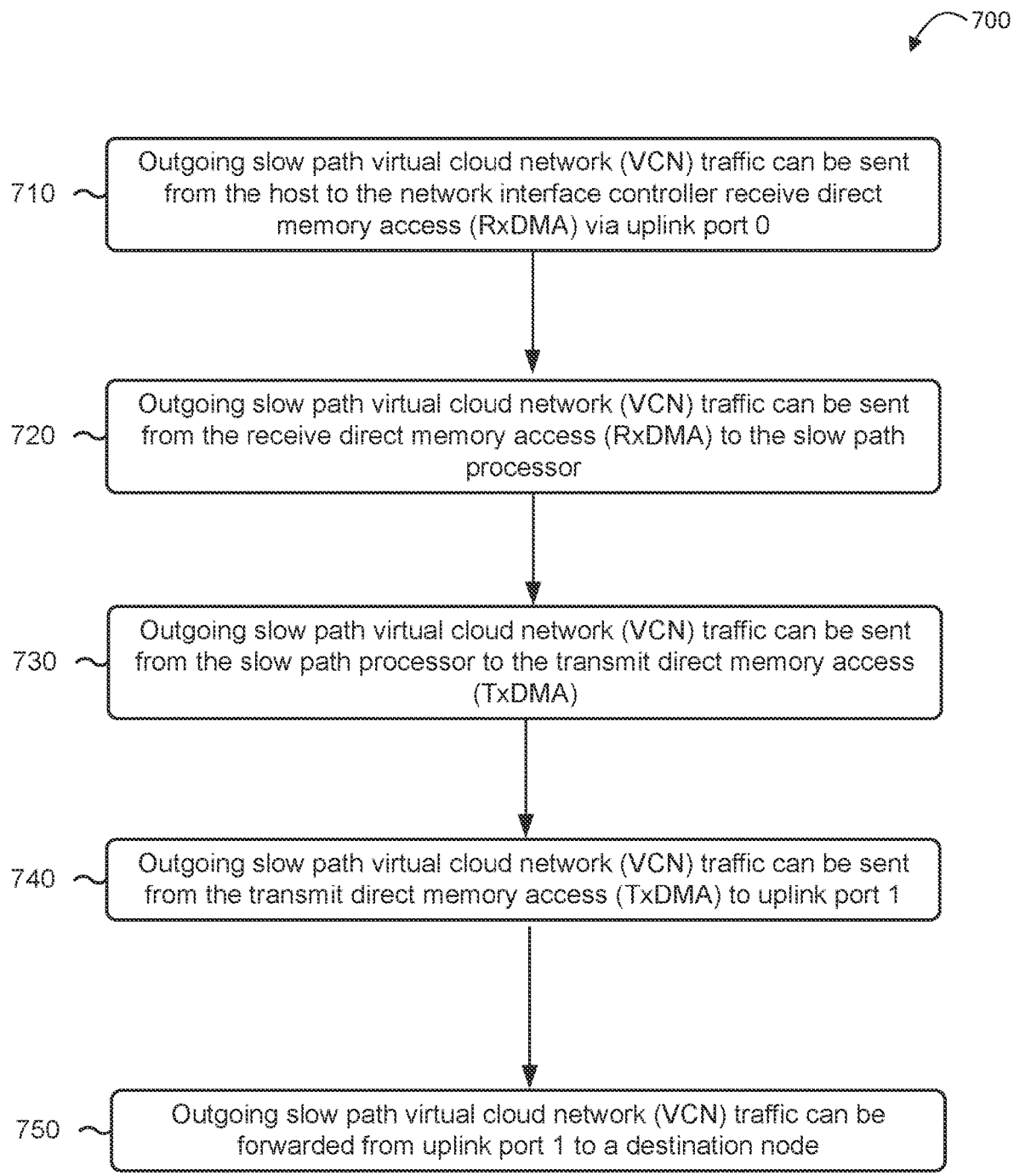
FIG. 7 shows a method 700 for sending outgoing VCN traffic through the slow path pipeline according to certain embodiments.

FIG. 7 shows a method 700 for sending outgoing virtual cloud network (VCN) traffic (e.g., first process traffic) through the slow path pipeline according to certain embodiments.

At block 710, outgoing VCN traffic, sent through slow path pipeline 600, can be sent from network interface card (NIC) driver 602 in host 604 to receive direct memory access (RxDMA) 612 in NIC 608 via the uplink port 0 606. NIC 608 can be a computer hardware component that connects a computer to a computer network. In some implementations, NIC 608 can be a smartNIC.

At block 720, packets from the outgoing VCN traffic are sent from the RxDMA 612 to slow path processor 610. The VCN traffic can be received at RxDMA 612 at the RX queue 638. Traffic can be sent from RX queue 638 to TX queue 614 after passing through the DPDK 616 and PPM 618.

At block 730, outgoing VCN traffic can be sent from the TX queue 614 in the slow path processor 610 to the VCN SOM rate limiter 620 in the TxDMA 622. VCN SOM rate limiter 620, in conjunction with storage bandwidth rate limiter 624, control TxDMA 622 usage in the slow path pipeline. In some implementations, the VCN SOM rate limiter 620 and storage bandwidth rate limiter can each receive a percentage of the TxDMA 622 processing power.

At block 740, the outgoing VCN traffic passing through VCN SOM rate limiter can be forwarded by the TxDMA MPUs 646 to the outgoing traffic port 626 in uplink port 1 628.

At block 750, the outgoing VCN traffic can be forwarded from the outgoing traffic port 626 to a destination node. The destination node can be located in a host machine connected to the NIC 608 via a local network or the destination node can be located in a public network.

Figure 8:
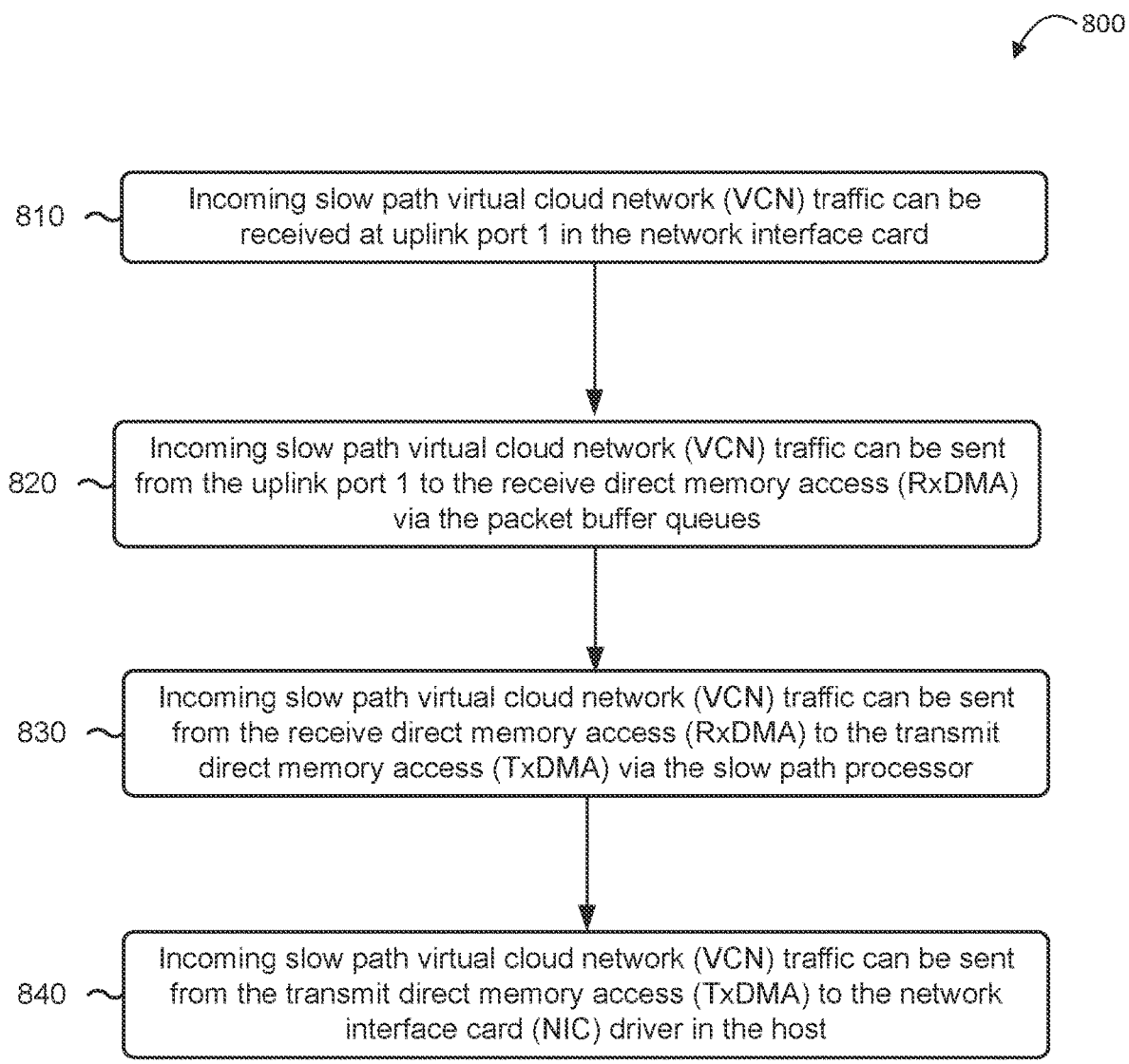
FIG. 8 shows a method 800 for receiving incoming VCN traffic through the slow path pipeline according to certain embodiments.

FIG. 8 shows a method 800 for receiving incoming virtual cloud network (VCN) traffic (e.g., first process traffic) through the slow path pipeline according to certain embodiments.

At block 810, incoming VCN traffic, from a source node, can be received at the incoming VCN traffic port 630 in uplink port 1 628. The source node can be located in a host machine connected to the NIC 108 via a local network or the source node can be located in a public network.

At block 820, the incoming VCN traffic can be forwarded from incoming traffic port 630 to VCN receive (RX) queue 632 in RX packet buffer queues 634. The incoming VCN traffic can be forwarded from VCN RX queue 632 to receive direct memory access (RxDMA) 612 using forwarding algorithm 636. Forwarding algorithm 636 can be a weighted round robin algorithm. Forwarding algorithm 636 can limit the amount of VCN traffic that is transmitted based at least in part on the bandwidth limit for VCN traffic (e.g., first process bandwidth).

At block 830, the RxDMA 612 can forward the incoming VCN traffic to the slow path processor 610 where the traffic can be stored in RX queue 638. The incoming VCN traffic can be forwarded to TX queue 614 via DPDK 616 and CPP 618 before the incoming VCN traffic can be sent to TxDMA 622.

At block 840, incoming VCN traffic can be received from slow path processor 610 at VCN SOM rate limiter 640 in TxDMA 622. The incoming VCN traffic can be forwarded to network interface card (NIC) driver 602 in host 604 via TxDMA MPUs 646 via uplink port 0 642.

Figure 9:
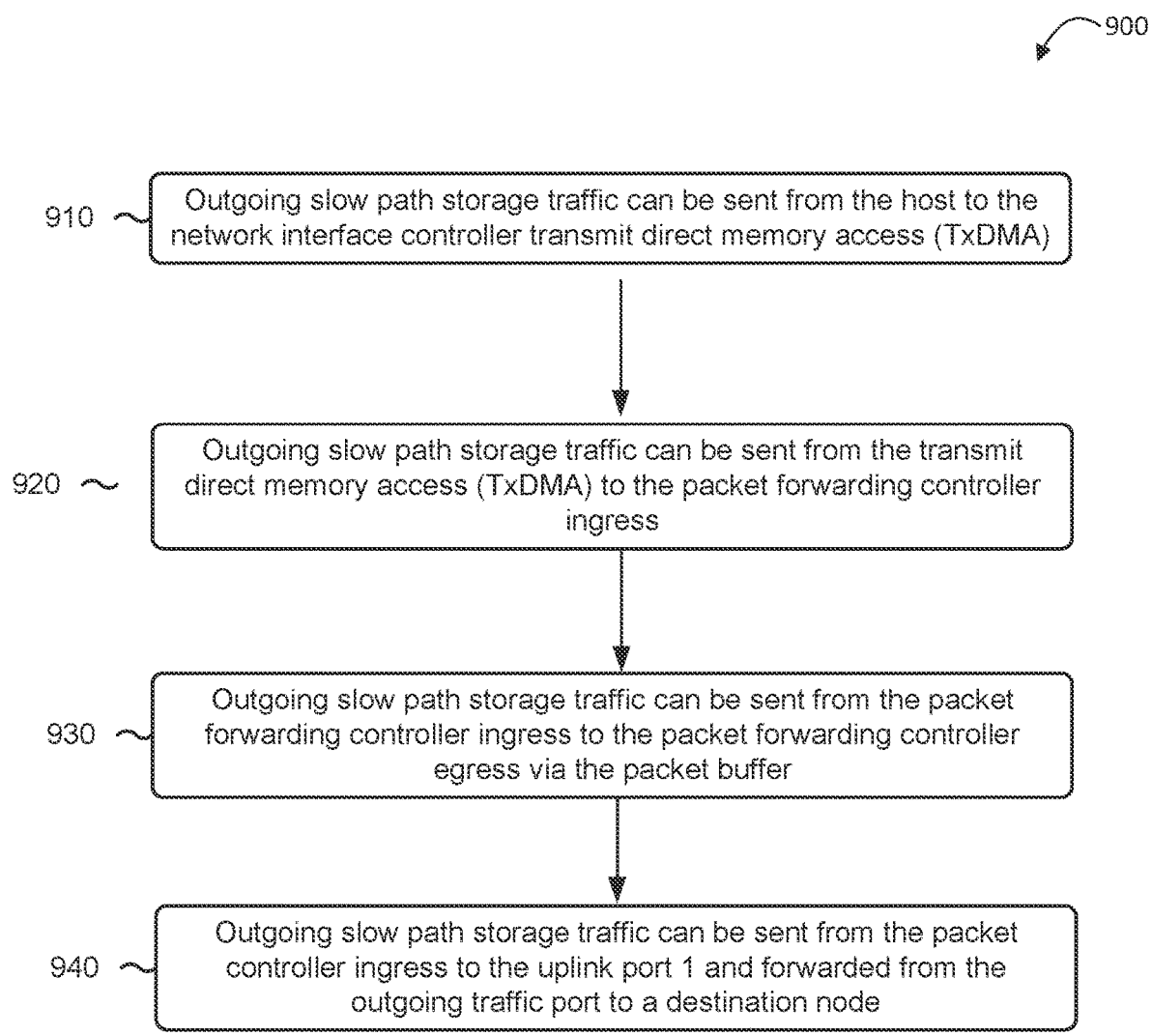
FIG. 9 shows a method for sending outgoing back-end storage traffic (e.g., second process traffic) through the slow path pipeline according to certain embodiments.

FIG. 9 shows a method 900 for sending outgoing back-end storage traffic (e.g., second process traffic) through the slow path pipeline according to certain embodiments.

At block 910, outgoing slow path storage traffic can be sent from host 604 to transmit direct memory access (TxDMA) 622 in network interface card 608. The traffic can be sent from the host by block device driver 606 and received at storage bandwidth rate limiter 624.

At block 920, outgoing slow path storage traffic can be sent from TxDMA 622 to packet forwarding controller ingress 644. The slow path storage traffic can be sent from TxDMA 622 to packet forwarding controller ingress 644 via storage bandwidth rate limiter 624 and TxDMA MPUs 646.

At block 930, outgoing slow path storage traffic can be sent from packet forwarding controller ingress 644 to packet forwarding controller egress 648. The traffic can be sent from packet forwarding controller ingress 644 to packet forwarding controller egress 648 via packet buffer 620.

At block 940, outgoing slow path storage traffic can be sent from packet controller egress 648 to outgoing traffic port 626 in uplink port 1 628. Traffic can be forwarded from outgoing traffic port 626 to a destination node.

Figure 10:
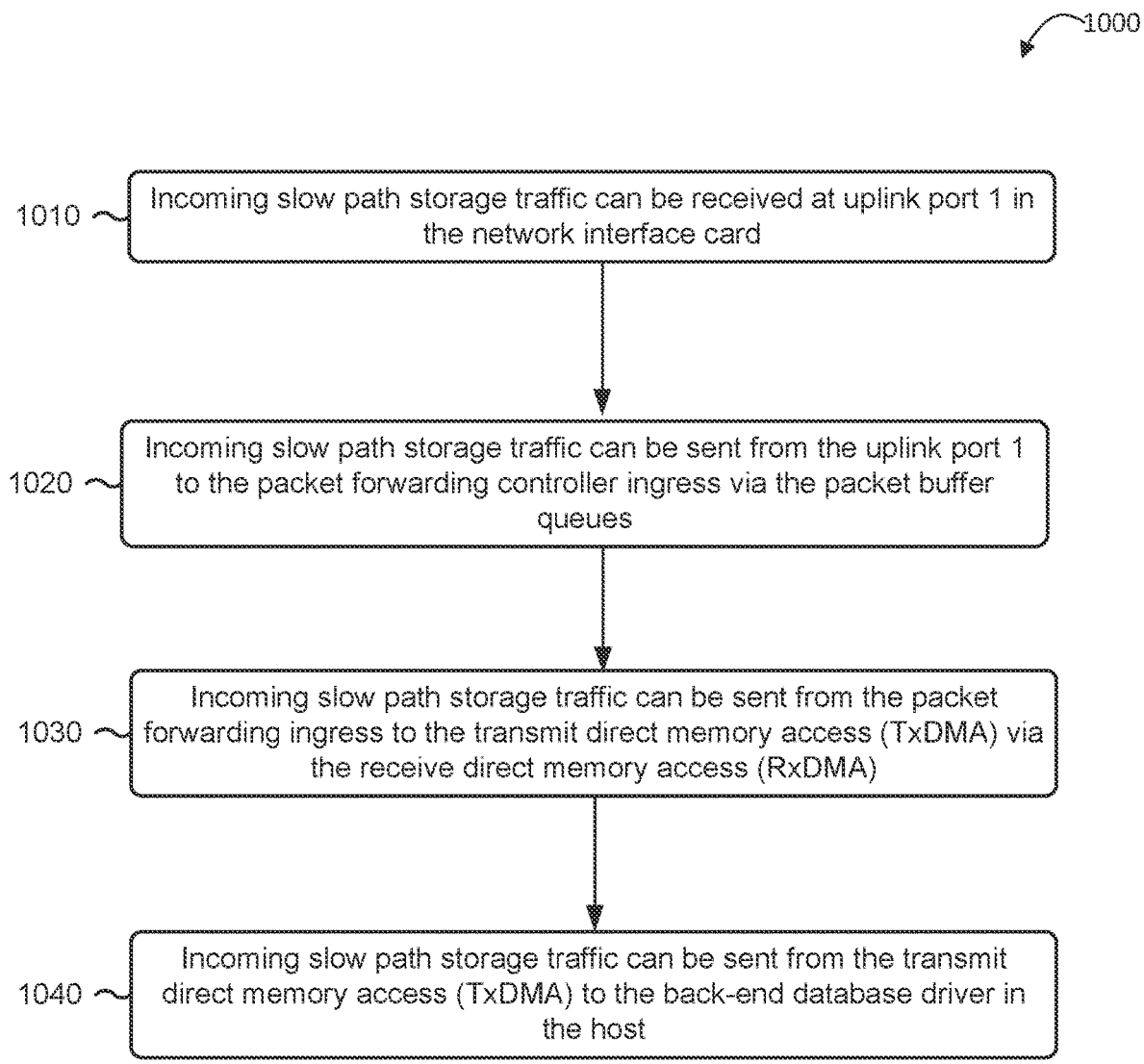
FIG. 10 shows a method for receiving incoming back-end storage traffic (e.g., second process traffic) through the slow path pipeline according to certain embodiments.

FIG. 10 shows a method 1000 for receiving incoming back-end storage traffic (e.g., second process traffic) through the slow path pipeline according to certain embodiments.

At block 1010, incoming slow path storage traffic can be received at uplink port 1 628 in network interface card 608. The incoming slow path storage traffic can be received at incoming storage traffic port 650 in uplink port 1 628.

At block 1020, the incoming slow path storage traffic can be sent from uplink port 1 628 to packet forwarding controller ingress 644. The incoming slow path storage traffic can be sent to packet forwarding controller ingress via packet buffer queues 620. The traffic can be received at back end database receive (RX) queue 652 before being provided to packet forwarding controller ingress 644 via forwarding algorithm 636.

At block 1030, incoming slow path storage traffic can be sent from packet forwarding ingress 644 to TxDMA 622. The incoming slow path storage traffic can be sent to TxDMA 622 via RxDMA 612. The traffic can be received at TxDMA MPUs 646 in TxDMA 622.

At block 1040, incoming slow path storage traffic can be sent from TxDMA 622 to host 604. The traffic can be received from TxDMA 622 at block device driver 606 in host 604. The incoming slow path storage traffic can be sent from TxDMA 622 via TxDMA MPUs 646.

Figure 11:
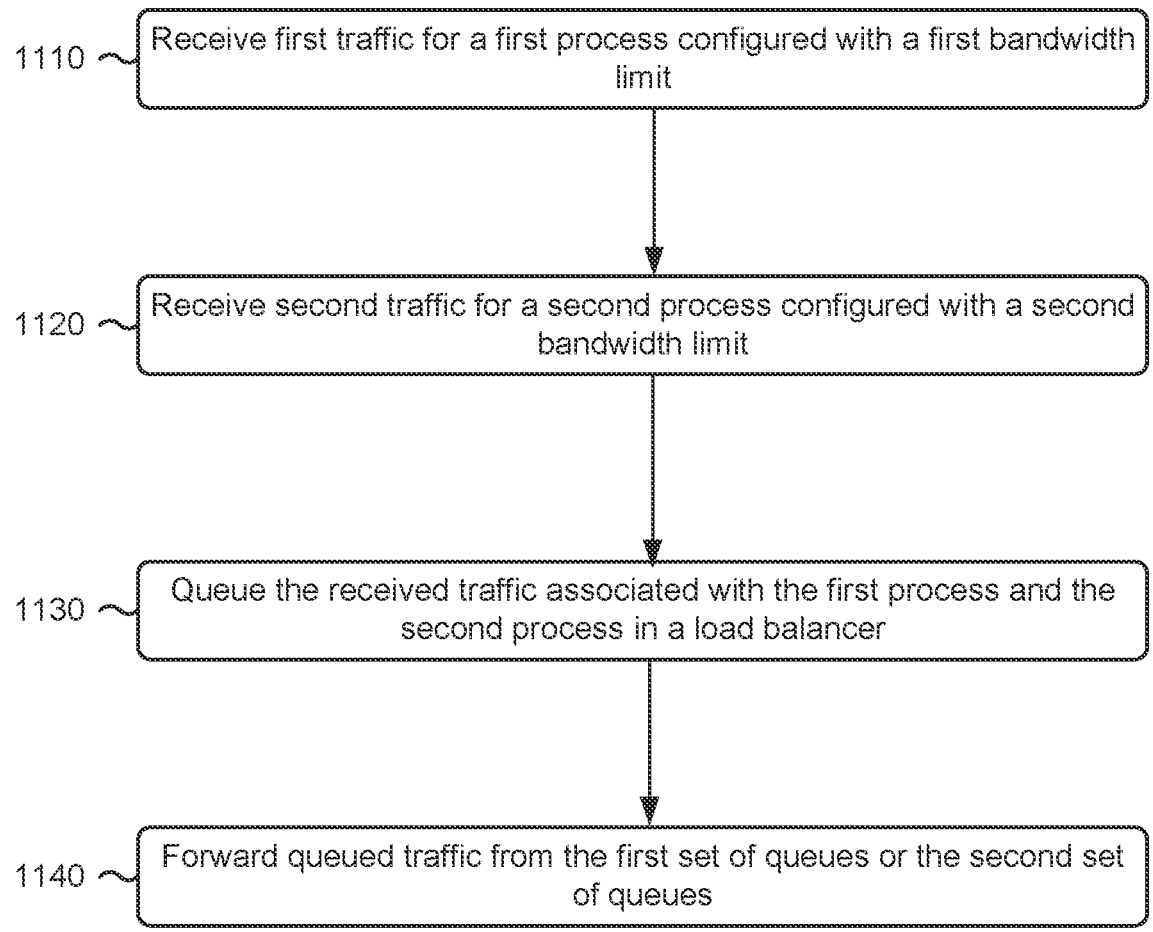
FIG. 11 is a flowchart of an example process associated with bandwidth control inside a shared network interface card (NIC).

FIG. 11 is a flowchart of an example process 1100 associated with bandwidth control inside a shared network interface card (NIC). In some implementations, one or more process blocks of FIG. 11 may be performed by a smartNIC. In some implementations, one or more process blocks of FIG. 11 may be performed by another device or a group of devices separate from or including the smartNIC.

At block 1110, a first traffic is received for a first process configured with a first bandwidth limit by one or more processors of the smart network interface card. The first bandwidth limit corresponding to a sum of a first transmit limit and a first receive limit associated with the first process. In some implementations, the first process can be a network interface card (NIC) driver. For instance, the first process can be NIC driver 104. The traffic can be received at a network interface card (e.g., NIC 108). The traffic can be received from a host or a source node at an uplink port in the NIC. The host can be a host like host 102.

At block 1120, a second traffic is received for a second process configured with a second bandwidth limit by one or more processors of the smart network interface card. The second bandwidth limit corresponding to half the sum of a second transmit limit and a second receive limit associated with the second process. In some implementations, the second process can be a non-volatile memory driver such as block device driver 106. In some implementations the block device driver can be a non-volatile memory express (NVMe) driver.

At block 1130, the received traffic associated with the first process and the second process is queued in a scheduler by one or more processors of the smart network interface card. In some circumstances, the received traffic can be queued in a separate class of packet buffer queues. The scheduler having a first set of queues configured to store traffic from the first process, and a second set of queues configured to store traffic from the second process. The scheduler can be a packet buffer, such as packet buffer 120, that uses a forwarding algorithm such as forwarding algorithm 130 or forwarding algorithm 138. In some implementations, the scheduler can be the back-end storage bandwidth rate limiter 142. The first set of queues can include VCN TX queue 124 and VCN RX queue 134. The second set of queues can include storage TX queue 148 and storage RX queue 152.

At block 1140, process 1100 may include forwarding, by one or more processors of the smart network interface card, queued traffic from the first set of queues or the second set of queues, a maximum amount of forwarded first process traffic corresponding to the first bandwidth limit minus an amount of forwarded second process traffic The traffic can be forwarded from the buffers by forwarding algorithm 130 or forwarding algorithm 138. In some implementations the traffic can be forwarded using a weighted round robin algorithm.

Process 1100 may include additional implementations, such as any single implementation or any combination of implementations described below and/or in connection with one or more other processes described elsewhere herein.

In a first implementation, traffic is forwarded according to a fair weighted round robin algorithm, where forwarded packets are assigned a weight corresponding to the packet size.

In a second implementation, the first process comprises one or more subprocesses and the second process comprises one or more subprocesses. The subprocesses can be one or more virtual machines (VMs) in the host.

In a third implementation, a subset of the first traffic is received through a pipeline where pipeline traffic is controlled by a rate limiter, the rate limiter limiting traffic based on a first global limit for traffic from the first process.

In a fourth implementation, the subset includes communication sent to open a connection with the first process and communication sent to close a connection with the first process.

In a fifth implementation, the subset is configured with a subset bandwidth limit.

In a sixth implementation, the second traffic received from the second process is controlled by a rate limiter, where the rate limiter limits traffic based on a second global limit for traffic from the second process.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Creating and running a cloud service can include mounting and connecting persistent storage to cloud instances. The persistent storage can be created, using a console or application programming interface (API), and linked to cloud instances (e.g., a virtual machine (VM) host or a bare metal (BM) host running in the cloud). Linking, or attaching, persistent storage to a cloud instance can be performed using a communication protocol. The attached storage can communicate with the cloud instance's guest operating system (OS) using the protocol.

Connections between a cloud instance and persistent storage are flexible and a number of configurations are possible. For instance, the persistent storage can be attached to one or more cloud instances simultaneously. The data in the persistent storage is durable and the storage can retain data after an attachment to a cloud instance is removed. Data can be migrated between instances by detaching persistent storage from one cloud instance and attaching the storage to a second instance.

Durable persistent storage can allow for instance scaling. A cloud instance can be deleted without destroying or reformatting the instance's persistent storage. After the cloud instance is deleted, the instances' persistent storage can be attached to a new instance. The new instance can be created with a different instance type or shape. For example, the new cloud instance can be a VM or a BM regardless of the deleted instance's type. Additionally, the number of cores in a cloud instance can be changed by deleting an initial instance and creating a new instance with a different number of cores.

A transfer of data through an attachment can be started with an endpoint called an initiator. Data can be sent from the initiator to an endpoint that can receive data called a target. An agent can set up the target to receive data and forward the data to the target. A number of advantages can be provided by locating the initiator in a smart network interface card (smartNIC). A user may need to provide login information or other configuration from the cloud instance if the initiator is located in the instance. Additionally, it can be difficult to keep the initiator functional across different guest OS types and OS versions. Locating the initiator in the smartNIC can also free customer resources that would be used to run the initiator.

Attachments can be provided using storage networking standards including Internet Small Computer Systems Interface (iSCSI), paravirtualized (PV) iSCSI, and Non-Volatile Memory Express (NVMe). iSCSI can provide attachments for bare metal (BM) devices with the initiator running from inside a customer instance. The initiator for PV iSCSI attachments can be set up and run inside a cloud instance's hypervisor, and PV iSCSI attachments can be limited to running on virtual machines (VM). The initiator for NVMe attachments can be run on a smartNIC. Accordingly, NVMe attachments can provide attachments for both VM and BM networks.

Figure 12:
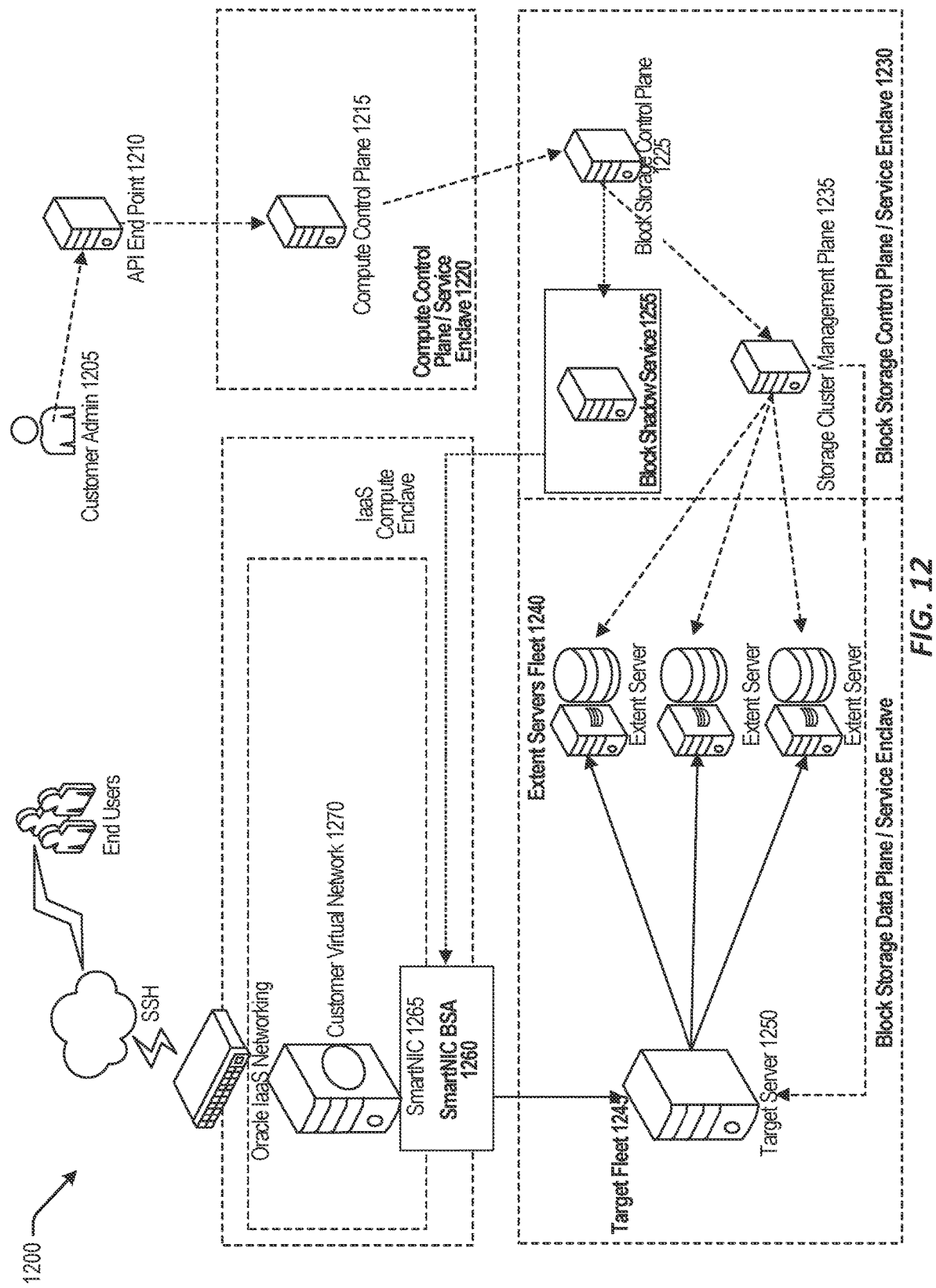
FIG. 12 is a simplified control path diagram showing cloud infrastructure components for attaching persistent storage, according to an embodiment.

FIG. 12 is a simplified control path diagram 1200 showing cloud infrastructure components for attaching persistent storage, according to an embodiment, for example, using NVMe. A customer administrator 1205 can submit a request for a new storage attachment at an application programming interface (API) endpoint 1210. In some examples, the customer administrator 1205 may be any entity that manages or otherwise administers the use of cloud instances for a customer of the cloud service. In some instances, the API endpoint 1210 may be an interface where customer's (e.g., customer administrator 1205) can access the cloud service resources, for example, by making requests to have operations performed by the cloud service on resources managed for the customer. The request can be forwarded to the compute control plane 1215 in a compute control plane service enclave 1220. In some instances, compute control plane 1215 can be a series of APIs that can provision, manage, reconfigure, or terminate resources based on user requests. The request can be forwarded from compute control plane 1215 to the block storage control plane 1225 in the block storage control plane enclave 1230. In some examples, the block storage control plane 1225 can be a series of APIs that can provision, manage, reconfigure, or terminate block storage.

A request that is received at block storage control plane 1225 can be forwarded to the storage cluster management plane 1235. Storage cluster management plane 1235 can manage the server fleets, and, for example, storage cluster management plane 1235 can manage extent server fleet 1240 and target server fleet 1245. In some examples, storage cluster management plane 1235 can configure and monitor extent server fleet 1240 or target server fleet 1245, and extent server fleet 1240 can include servers storing striped and encrypted customer data. Volumes can be striped across multiple extent servers in extent server fleet 1240. Extent servers can be a block storage data plane service that handles extent-level I/O and stores the data for replication. In response to the request, storage cluster management plane 1235 can identify at least one target server 1250 in the target server fleet 1245 as a target server for the attachment. In some instances, target server 1250 can be a server that manages the flow of customer data to and from extent server fleet 1240. Target server 1250 can accept I/O requests from a NVMe initiator and send the requests to extent server fleet 1240. The storage cluster management plane 1235 can select the target server 1250 based at least in part on the load experienced by the servers in the target server fleet 1245, or the expected volume for the attachment. Storage cluster management plane 1235 can forward information about the new attachment to the selected target server 1250 or the extent server fleet 1240. The information can identify one or more target servers that are able to receive traffic from the new attachment.

The request can be forwarded from block storage control plane 1225 to the block shadow service 1255. The block shadow service 1255 can act as an agent, and block shadow service 1255 can communicate with the block smartNIC agent (BSA) 1260 in smartNIC 1265. In some examples, smartNIC 1265 can be hardware that can connect the customer virtual network 1270 to other computer networks. BSA 1260 can serve as a communication link between block shadow service 1255 and an NVMe agent in smartNIC 1265. Communication from the block shadow service 1255 can provide information about the target server and the attachment to BSA 1260. A connection between the customer virtual network 1270 and target server fleet 1245 can be established by BSA 1260. BSA 1260 can expose a namespace to the host through host PCIe connection, which can be accessed by the host applications and by the customer through the customer virtual network 1270. The customer virtual network 1270 can be set up by the VCN, and traffic from customer virtual network 1270 can reach extent servers fleet 1240 via target server fleet 1245 through smartNIC 1265.

Figure 13:
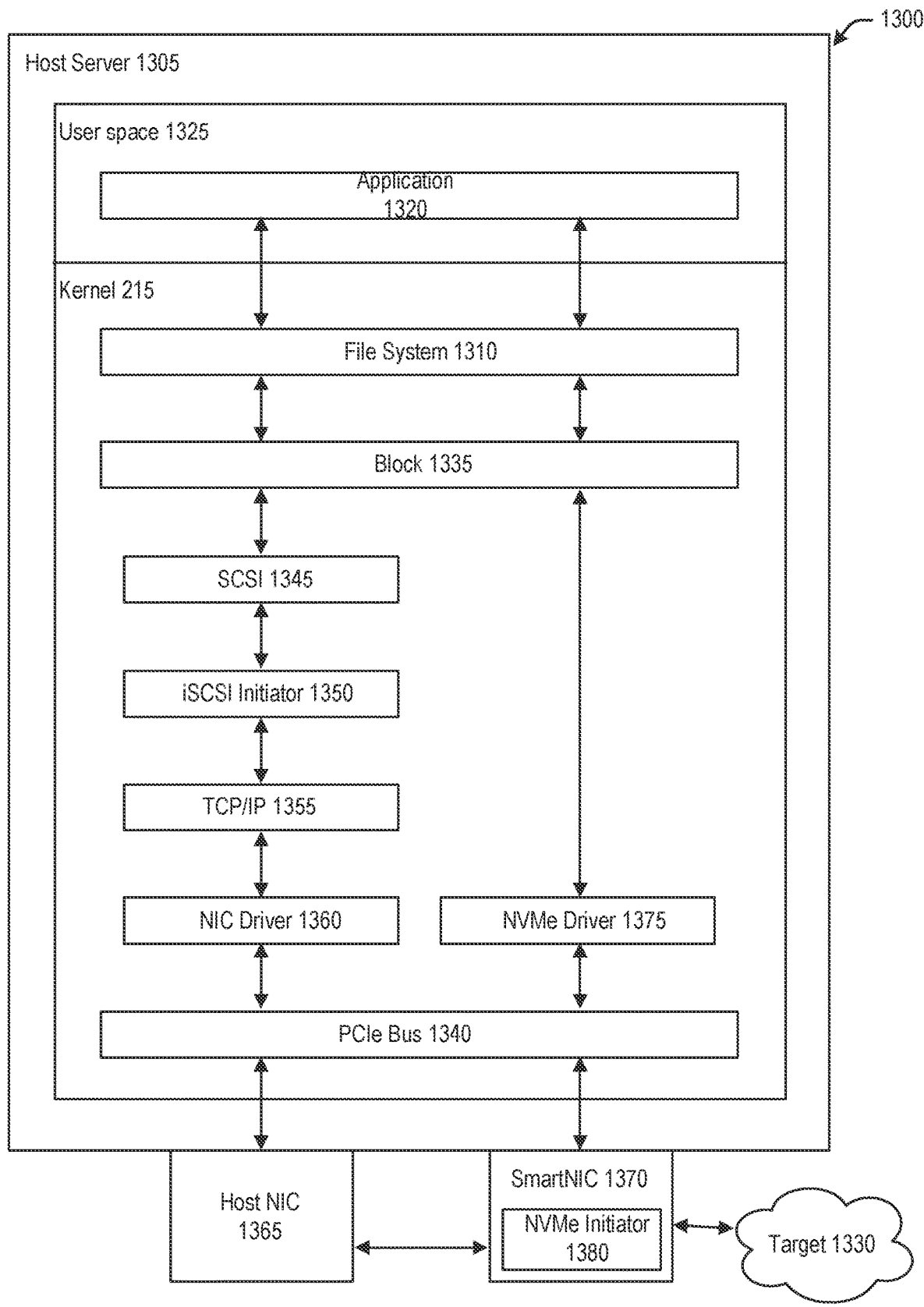
FIG. 13 is a diagram showing a kernel architecture for implementing Internet Small Computer Systems Interface (iSCSI) and Non-Volatile Memory Express (NVMe) attachments according to an embodiment.

FIG. 13 is a diagram 1300 showing a kernel architecture for implementing Internet Small Computer Systems Interface (iSCSI) and Non-Volatile Memory Express (NVMe) attachments according to an embodiment. NVMe and iSCSI are networking protocols providing block-level storage access, and both NVMe and iSCSI can be used to attach persistent storage. One difference between the two standards is that, in an iSCSI architecture, input/output (IO) requests reach a smartNIC via a host network interface card (NIC), and, in an NVMe architecture, the smartNIC is directly connected to a Peripheral Component Interconnect Express (PCIe) bus. The NVMe kernel stack can be streamlined compared to the iSCSI stack, and NVMe's simplified architecture can be achieved because the NVMe initiator can be located in the smartNIC.

In a host server 1305, using either networking protocol, traffic can reach a file system 1310 in the kernel 1315 from an application 1320 in the user space 1325. The traffic can be addressed to a target 1330 that can be a block storage server (e.g., target fleet 1245, extent servers fleet 1240, etc.). Traffic for the two standards can follow similar pathways until the traffic arrives at block 1335 from file system 1310.

Using iSCSI, traffic from block 1335 reaches the PCIe bus 1340 via SCSI 1345, iSCSI initiator 1350, TCP/IP 1355, and the NIC driver 1360. iSCSI traffic leaving PCIe bus 1340 can reach the target via host NIC 1365 and smartNIC 1370. In some instances, PCIe bus 1340 can be a serial computer expansion bus. The NVMe pathway can follow a different pathway, and NVMe traffic can reach PCIe bus 1340 from block 1335 via NVMe driver 1375. Instead of passing through host NIC 1365, NVMe traffic can travel from PCIe 1340 to smartNIC 1370 before reaching target 1330. The NVMe initiator 1380 can be located in smartNIC 1370 instead of being located in kernel 1315 like iSCSI initiator 1350.

Figure 14:
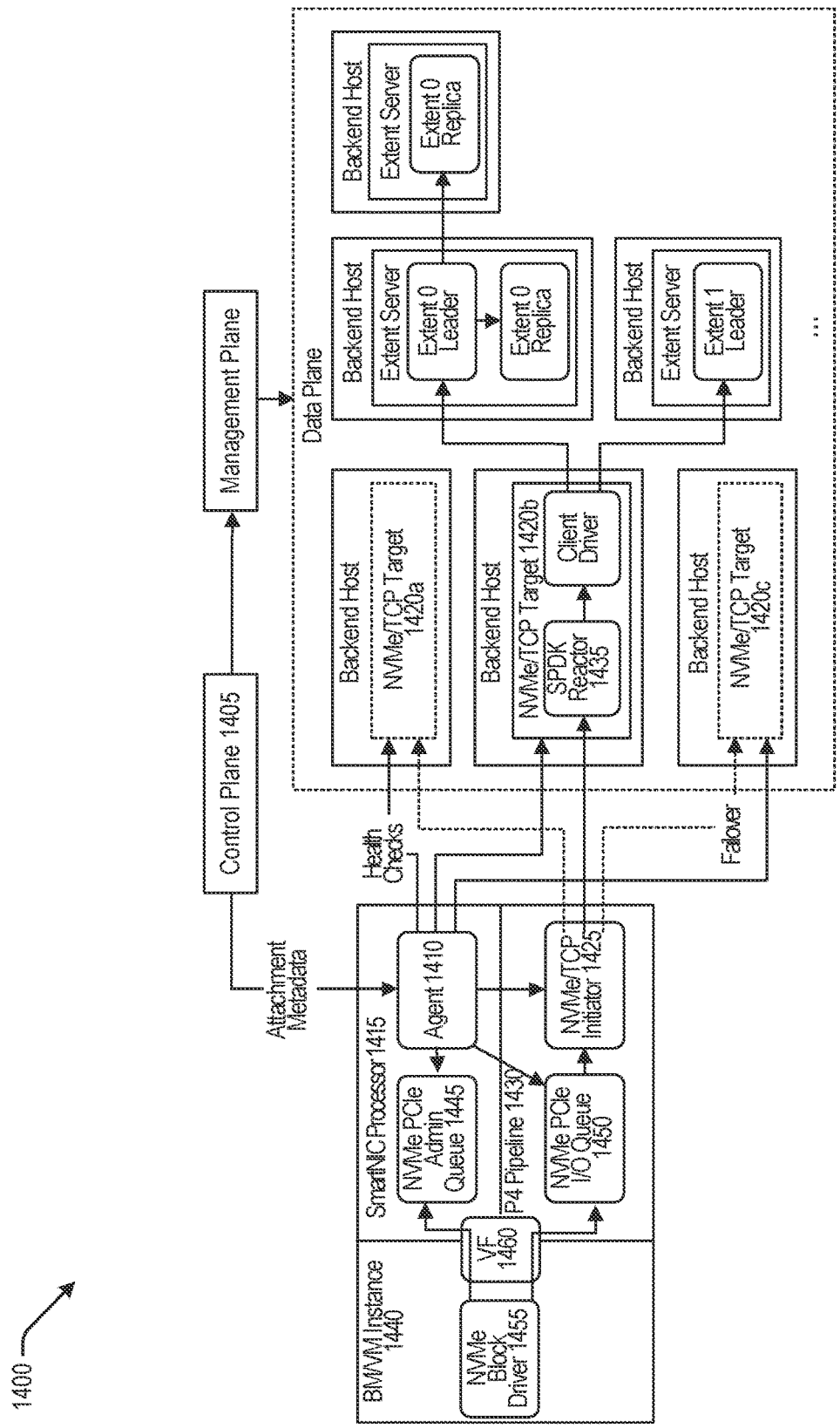
FIG. 14 is a Non-Volatile Memory Express (NVMe) system diagram according to an embodiment.

FIG. 14 is a Non-Volatile Memory Express (NVMe) system diagram 1400 according to an embodiment. A customer, such as customer admin 1205, can initiate an NVMe attachment request from the console or a public API (e.g., API end point 1210). The NVMe attachment request can be forwarded from the control plane 1405 (e.g. block storage control plane 1225) to an agent 1410 (e.g., smartNIC BSA 1260) in the smartNIC processor 1415. The agent 1410 can perform health checks on NVMe/TCP targets 1420*a-c* to identify healthy targets, and agent 1410 can instruct the NVMe/TCP initiator 1425 in the Programming Protocol-Independent Packet Processors (P4) pipeline 1430 to establish a connection with a healthy NVMe/TCP target (e.g., NVMe/TCP target 1420*b*). P4 is a domain-specific programming language that is optimized for controlling packet forwarding. NVMe/TCP initiator 1425 can communicate with Storage Performance Development Kit (SPDK) reactor 1435 to initiate the connection.

Once a connection is established with NVMe/TCP target 1420*b* and the NVMe attachment is completed, virtual machine/bare metal (VM/BM) instance 1440 can issue NVMe admin commands or NVMe I/O commands to the NVMe/TCP target 1420*b*. The NVMe commands can be issued from BM/VM instance 1440 to NVMe PCIe admin queue 1445 or NVMe PCIe I/O queue 1450 via NVMe block driver 1455 and virtual function (VF) 1460. In some examples, VF 1460 can be a PCIe function that supports single root I/O visualization (SR-IOV). In some instances, the admin queue can be used to establish host-controller associations and the queue can support commands like Identify, Get/Set Features, etc. Agent 1410 can retrieve NVMe admin commands from the NVMe PCIe admin queue 1445 and forward those commands to NVMe/TCP target 1420*b*, or the commands can be processed locally. I/O commands received from VM/BM instance 1440 can be enqueued into NVMe PCIe I/O queue 1450. NVMe block driver 1455 can retrieve the enqueued commands from NVMe PCIe I/O queue 1450 to NVMe/TCP target 1420*b* via NVMe/TCP initiator 1425.

Figure 15:
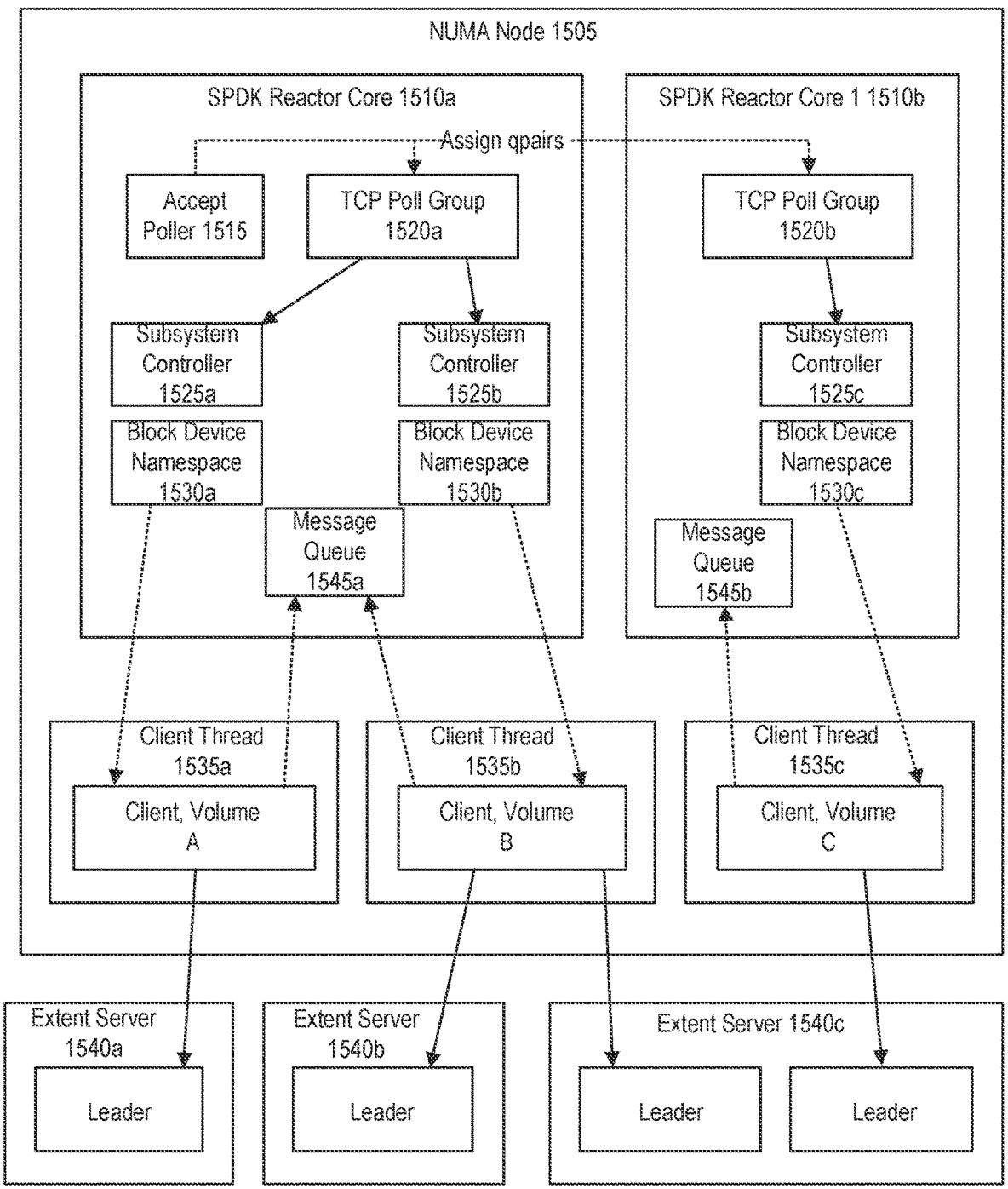
FIG. 15 is a diagram of a Non-Volatile Memory Express (NVMe)/Transmission control Protocol (TCP) target according to an embodiment.

FIG. 15 is a diagram 1500 of a Non-Volatile Memory Express (NVMe)/Transmission control Protocol (TCP) target according to an embodiment. The NVMe/TCP target (e.g., NVMe/TCP target 1420*b*) can be a Non-Uniform Memory Access (NUMA) node 1505 that can include a central processing unit coupled with memory. Cores in the NUMA node 1505 CPU can be assigned to one or more SPDK reactor cores such as SPDK reactor cores 1510*a-b* (e.g., SPDK reactor 1435). Accept poller 1515 can accept new connections to the SPDK reactor and assign the new connections to a SPDK reactor core (e.g., SPDK reactor core 1510*a*). Accept Poller 1515 can assign new connections to an available TCP poll group 1520*a-b* in an available SPDK reactor core 1510*a-b*, and the new connections can be assigned using a round robin algorithm.

Subsystem controllers 1525*a-c* can be assigned to a new connection, and, for example, subsystem controller 1525*a* can be assigned for a connection made with TCP poll group 1520*a*. More than one subsystem controller 1525*a-c* can be assigned to one of the TCP poll groups 1520*a-b*, and, for instance, subsystem controller 1525*a* and subsystem controller 1525*b* can be assigned to TCP poll group 1520*a*. Block device namespaces 1530*a-c* can be generated when a connection is made with one of the subsystem controllers 1525*a-c*.

Threads in a NUMA node CPU can be assigned as client threads 1535*a-c* by one of the block device namespaces. Block device namespaces 1530*a-c* can forward a request that is received through the new connection to one of the client threads 1535*a-c*, and client threads 1535*a-c* can decide which extent server 1540*a-c* should receive the data associated with the request. After completing the request, client threads 1535*a-c* can send a response to message queue 1545*a-b* to indicate that a request has been completed. Requests can be received at a SPDK reactor core 1510*a-b* from the smartNIC initiator (e.g., NVMe/TCP initiator 1425, NVMe initiator 1380, etc.) or a different initiator (e.g., iSCSI initiator 1350). Responses can be sent from one of the SPDK reactor cores 1510*a-b* to the smartNIC initiator or a different initiator.

Figure 16:
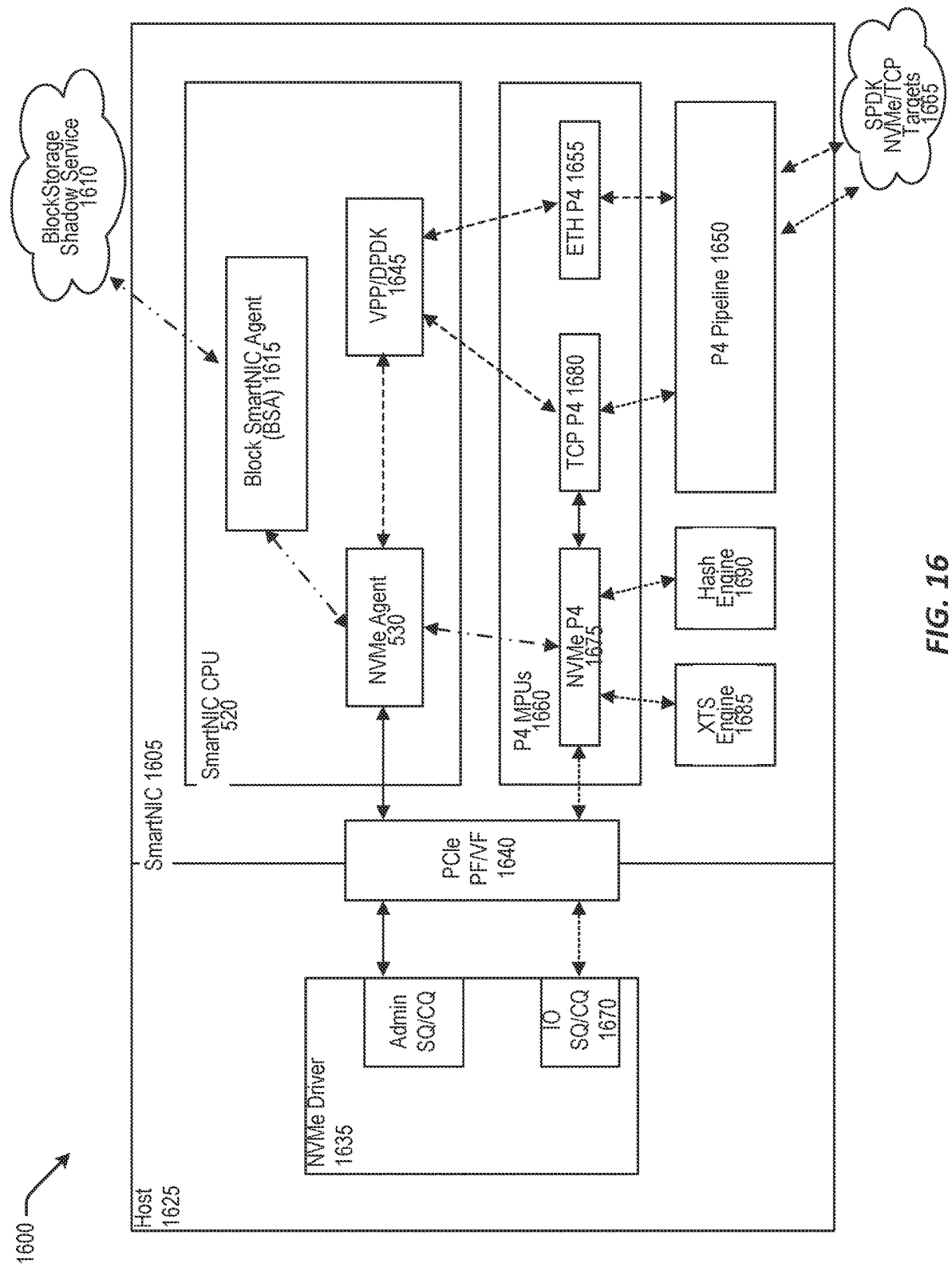
FIG. 16 is a simplified diagram of a smart network interface card (smartNIC) with Non-Volatile Memory Express (NVMe) according to an embodiment.

FIG. 16 is a simplified diagram 1600 of a smart network interface card (smartNIC) with Non-Volatile Memory Express (NVMe) according to an embodiment. Requests can be received at smartNIC 1605 from the block storage shadow service 1610 (e.g., block storage shadow service 1255) in the control plane (e.g., block storage control plane 1225, control plane 1405, etc.). The requests can be received at the block smartNIC agent (BSA) 1615 (e.g., BSA 1260) running on the smartNIC central processing unit (CPU) 1620. BSA 1615 can serve a number of functions including performing health checks, ensuring that targets are available, or performing telemetry. BSA 1615 forwards instructions or requests to the host 1625, or other smartNIC components, via NVMe Agent 1630. Requests or instructions can be sent from NVMe Agent 1630 to the NVMe driver 1635 via a PCIe physical function or virtual function (PF/VF) 1640 (e.g., VF 1460).

The NVMe agent 1630 can establish a new I/O connection in response to a request from BSA 1615 using the vector packet processing/dataplane development kit (VPP/DPDK) module 1645. The VPP/DPDK module can use a framework, such as VPP with the DPDK plugin, to process and route network packets. Upon receiving a request from NVMe agent 1630, VPP/DPDK 1645 can send a request to the P4 pipeline 1650 (e.g., P4 pipeline 1430) via the Ethernet (ETH) P4 module 1655 running on the P4 match protection unit (MPU) 1660. P4 pipeline 1650 can establish an I/O connection with SPDK NVMe/TCP targets 1665 (e.g., target 1330, target fleet 1245, NVMe/TCP target 1420*a-c*, etc.). Establishing a connection can include sending instructions to NVMe driver 1635 or SPDK NVMe/TCP targets 1665

The I/O communication can be offloaded to a fast path I/O pipeline after an I/O connection is established with an SPDK NVMe/TCP target 1665. The I/O fast path traffic can travel along the fast path pipeline from the I/O submission queue/ completion queue (SQ/CQ) 1670 in host 1625 to P4 MPUs 1660 via PCIe PF/VF 1640. I/O traffic can be received in P4 MPUs 1660 at NVMe P4 1675 and forwarded to the SPDK NVMe/TCP targets 1665 via TCP P4 1680 and P4 pipeline 1650. Traffic in I/O SQ/CQ 1670 can start from the submission queue and end at the completion queue when I/O completes. If traffic along the fast path pipeline fails, NVMe P4 1675 or TCP P4 1680 can inform NVMe Agent 1630 of the failure. NVMe agent 1630 can be configured so that NVMe agent can create a new I/O connection in response to the failure and offload the new connection to the fast path pipeline. XTS engine 1685 is an encryption engine that can encrypt user data using the xor-encrypt-xor (XEX)-based tweaked-codebook mode with ciphertext stealing (XTS) block cypher, and hash engine 1690 can use cryptographic hash functions to verify data integrity.

Figure 17:
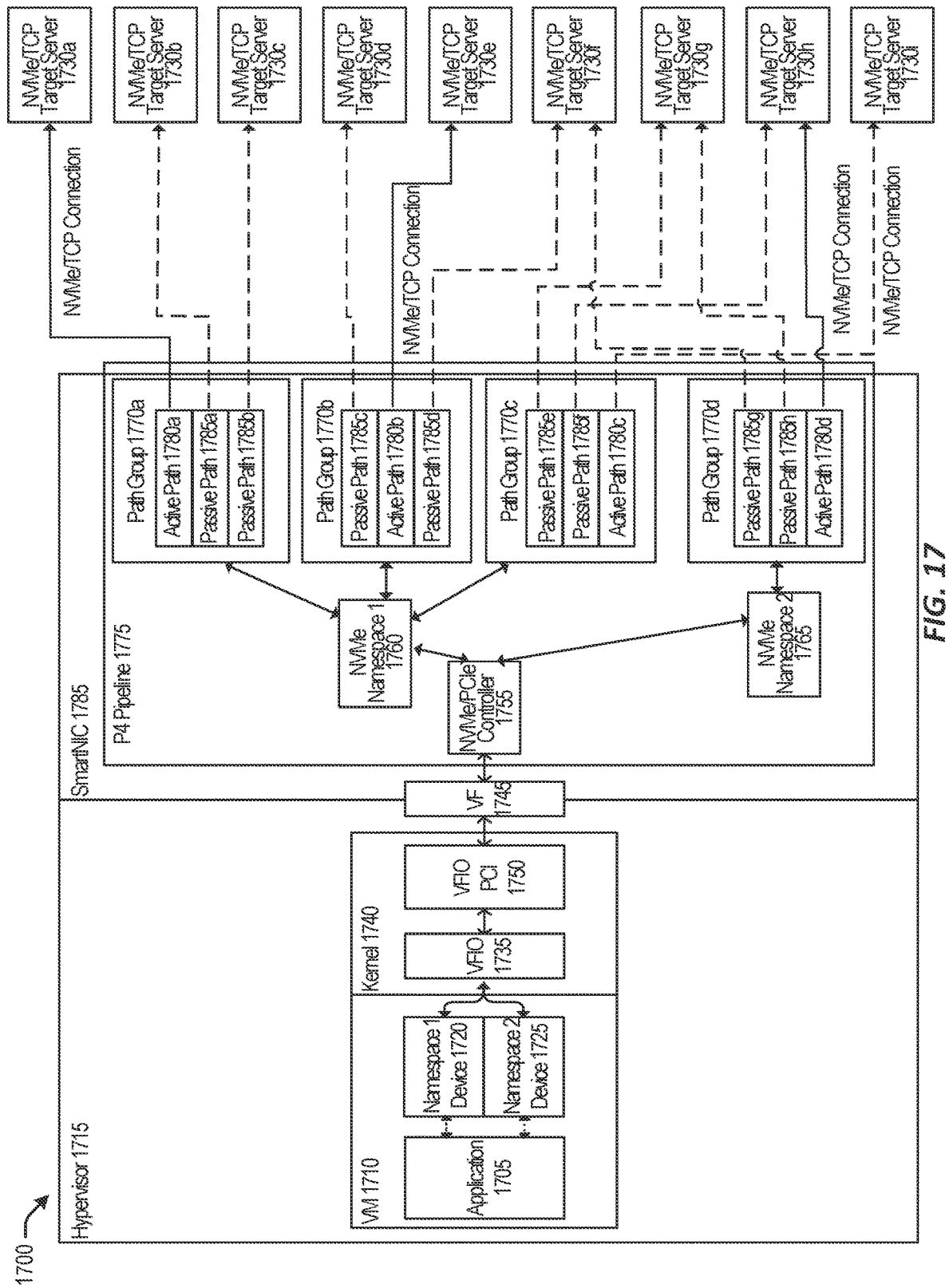
FIG. 17 is a diagram showing multipath handling in a smart network interface card (smartNIC) according to an embodiment.

FIG. 17 is a diagram 1700 showing multipath handling in a smart network interface card (smartNIC) according to an embodiment. An application 1705 can run in a virtual machine (VM) 1710 managed by a hypervisor 1715. Application 1705 can be similar to application 1320, and VM 1710 can be a bare metal machine (e.g., BM/VM instance 1440). Two namespaces devices, namespace 12 device 1720 and namespace 13 device 1725, can be associated with Application 1705. A namespace can be a NVM storage that is formatted for block access. A namespace can be analogous to a logical unit in SCSI, and a block storage volume can be a single namespace. Traffic between namespace 12 1720 or namespace 13 1725 and the NVMe/TCP target servers 1730*a-i* (e.g., target server 1250) can be received via the virtual function input/output queue (VFIO) 1735 in the kernel 1740. The virtual function (VF) 1745 can be connected to VFIO 1735 via the VFIO peripheral component interconnect (PCI) 1750. VF 1745 can be a virtual function or a physical function.

The NVMe/PCIe controller 1755 can route traffic from the namespace devices to NVMe namespaces. For instance, traffic can be routed between namespace device 12 1720 and NVMe namespace 12 1760, and traffic can be routed between namespace device 13 1725 and NVMe namespace 13 1765. The namespace devices can be associated with one or more path groups 1770*a-d* located in the P4 pipeline 1775 (e.g., P4 pipeline 1650, P4 MPUs 1660, etc.) in smartNIC 1780 (e.g., smartNIC 1265, smartNIC 1370, smartNIC 1605, etc.). For instance, NVMe namespace 12 1760 can route traffic to path groups 1770*a-c*, and NVMe namespace 13 1765 can route traffic to path group 1770*d*.

Path groups can contain an active path 1780*a-d* and one or more passive paths 1785*a-h*. Active paths 1780*a-d* or passive paths 1785*a-h* can be associated with a NVMe/TCP target server 1730*a-i*. Traffic between a NVMe/TCP target server 1730*a-i* and namespace device 12 1720 or namespace device 13 1725 can be routed via active paths 1780*a-d*. NVMe/TCP target servers 1730*a-i* can route traffic to and from extent servers (e.g., extent servers fleet 1240, extent servers 1540*a-c*, etc.).

Traffic can be routed via a passive path 1785*a-h* if an active path 1780*a-d* fails. In response to a failure, passive path 1785*a-h* can login to an extent server via NVMe/TCP target servers 1730*a-h*. The extent server can change a token from the token for an active path 1780*a-d* to a token for a passive path 1785*a-h*. The extent server can use the token to determine whether to accept traffic from a path (e.g., active paths 1780*a-d* or passive paths 1785*a-h*).

Figure 18:
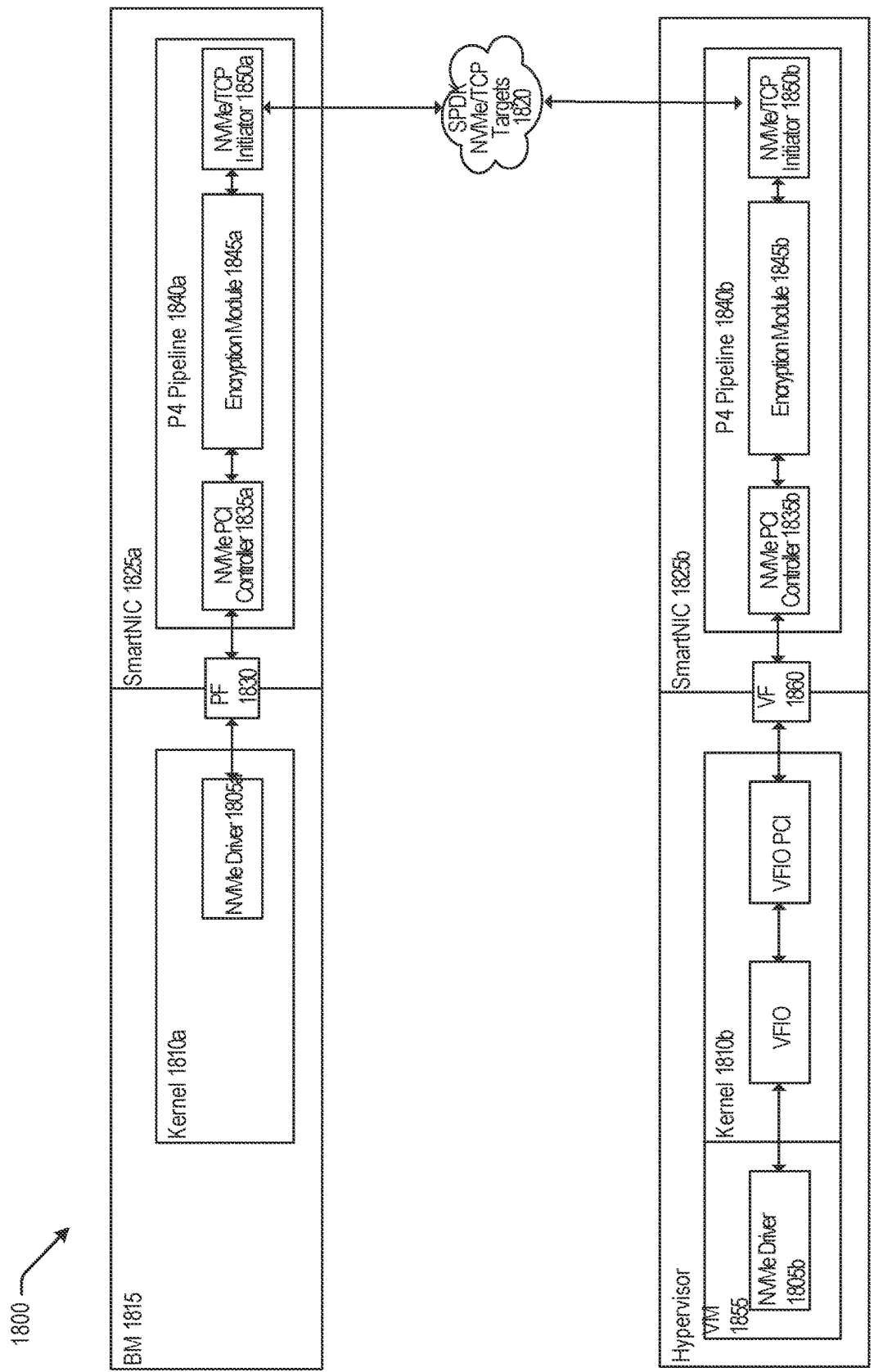
FIG. 18 shows a diagram of an architecture for performing encryption/decryption with a smart network interface card (smartNIC) according to an embodiment.

FIG. 18 shows a diagram of an architecture 1800 for performing encryption/decryption with a smart network interface card (smartNIC) according to an embodiment. The architecture 1800 can provide a unified means for encrypting/decrypting both VM and BM traffic. NVMe driver 1805*a* can run in the kernel 1810*a* of a bare metal (BM) machine 1815 (e.g., BM/VM instance 1440, etc.). Traffic can be sent from NVMe driver to SPDK NVMe/TCP targets 1820 via smartNIC 1825*a*. The BM traffic can be received via a physical function (PF) 1830 (e.g., PCIe PF/VF 1640, etc.) at the NVMe PCI controller 1835*a* (e.g., NVMe/PCIe controller 1755, NVMe P4 1675, etc.) in the P4 pipeline 1840*a* (e.g., P4 MPUs 1660, P4 pipeline 1650, etc.).

Outgoing BM traffic traveling from NVMe driver 1805*a* to SPDK NVMe/TCP targets 1820 can be encrypted by the encryption module 1845*a* in smartNIC 1825*a*, and incoming BM traffic can be decrypted by the encryption module 1845*a*. Encryption module 1845*a* can encrypt or decrypt traffic using an encryption algorithm such as Advanced Encryption Standard (AES). The encrypted BM traffic can be sent to SPDK NVMe/TCP targets 1820 via the NVMe/TCP initiator 1850*a* (e.g., NVMe initiator 1380, NVMe/TCP initiator 1425, etc.). Incoming encrypted BM traffic from SPDK NVMe/TCP targets 1820 can be received at NVMe/TCP initiator 1850*a* before being forwarded along the pathway to NVMe driver 1805*a*. Incoming encrypted BM traffic can be decrypted by the encryption module 1845*a*.

Outgoing VM traffic can be sent from NVMe driver 1805*b* in the virtual machine (VM) 1855 (e.g., BM/VM instance 1440, VM 1710, etc.) to the virtual function input/ output (VFIO) 1860 in kernel 1810*b* via a virtual function (VF) 1860 (e.g., VF 1460, VF 1745, etc.). The outgoing VM traffic can be forwarded to NVME PCI controller 1835*b* in P4 pipeline 1840*b*. The outgoing VM traffic can be forwarded from smartNIC 1825*b* to SPDK NVMe/TCP targets 1820 via encryption module 1845*b* and NVMe/TCP initiator 1850*b*. Incoming VM traffic from SPDK NVMe/TCP targets 1820 can be received at NVMe/TCP initiator 1850*b* before the incoming traffic is forwarded along the pathway to NVMe driver 1805*b*. Incoming encrypted VM traffic can be decrypted by the encryption module 1845*a*.

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 19:
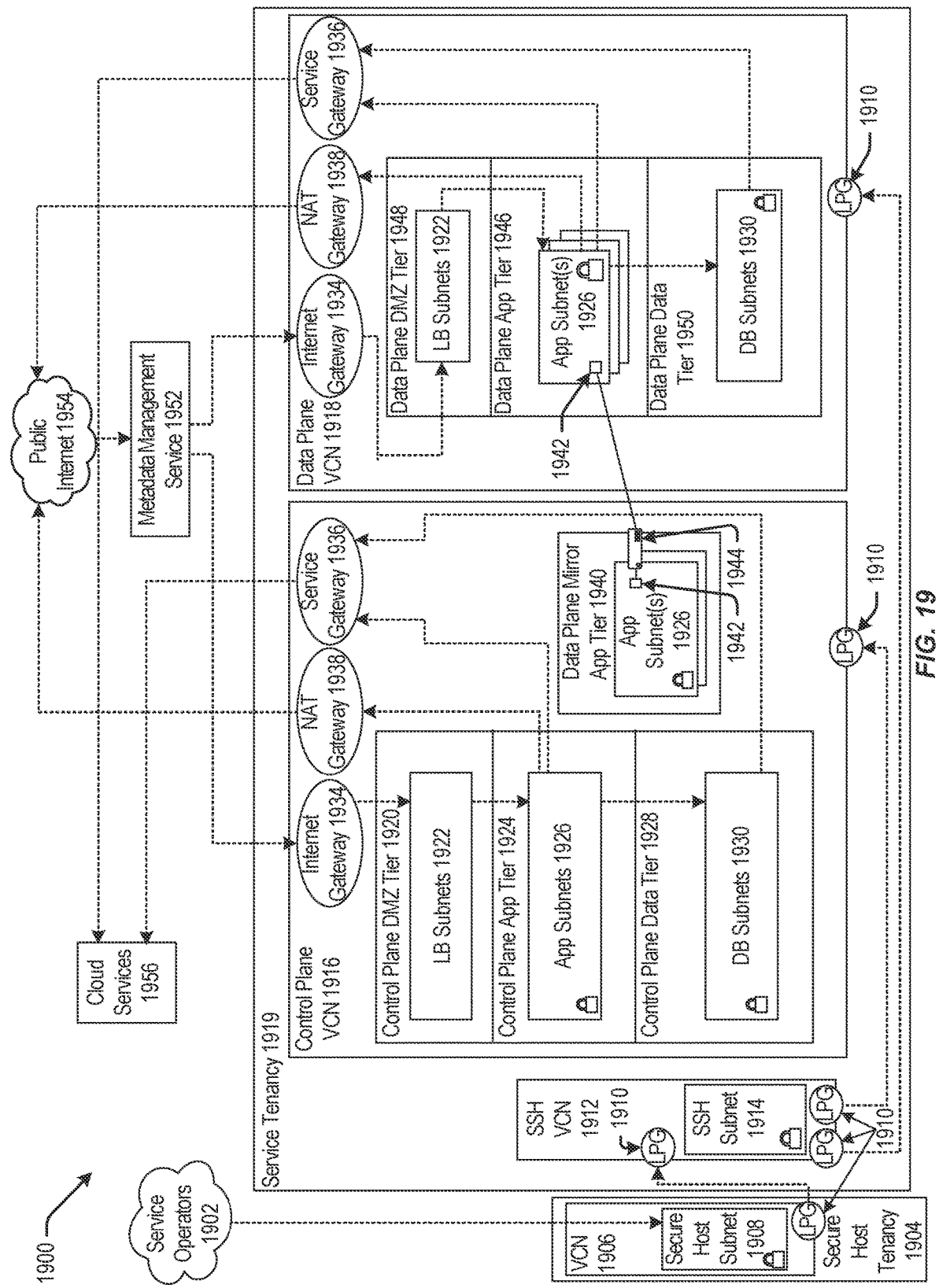
FIG. 19 is a block diagram illustrating one pattern for implementing a cloud infrastructure as a service system, according to at least one embodiment.

FIG. 19 is a block diagram 1900 illustrating an example pattern of an IaaS architecture, according to at least one embodiment. Service operators 1902 can be communicatively coupled to a secure host tenancy 1904 that can include a virtual cloud network (VCN) 1906 and a secure host subnet 1908. In some examples, the service operators 1902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1906 and/or the Internet.

The VCN 1906 can include a local peering gateway (LPG) 1910 that can be communicatively coupled to a secure shell (SSH) VCN 1912 via an LPG 1910 contained in the SSH VCN 1912. The SSH VCN 1912 can include an SSH subnet 1914, and the SSH VCN 1912 can be communicatively coupled to a control plane VCN 1916 via the LPG 1910 contained in the control plane VCN 1916. Also, the SSH VCN 1912 can be communicatively coupled to a data plane VCN 1918 via an LPG 1910. The control plane VCN 1916 and the data plane VCN 1918 can be contained in a service tenancy 1919 that can be owned and/or operated by the IaaS provider.

The control plane VCN 1916 can include a control plane demilitarized zone (DMZ) tier 1920 that acts as a perimeter network (e.g., portions of a corporate network between the corporate intranet and external networks). The DMZ-based servers may have restricted responsibilities and help keep security breaches contained. Additionally, the DMZ tier 1920 can include one or more load balancer (LB) subnet(s) 1922, a control plane app tier 1924 that can include app subnet(s) 1926, a control plane data tier 1928 that can include database (DB) subnet(s) 1930 (e.g., frontend DB subnet(s) and/or backend DB subnet(s)). The LB subnet(s) 1922 contained in the control plane DMZ tier 1920 can be communicatively coupled to the app subnet(s) 1926 contained in the control plane app tier 1924 and an Internet gateway 1934 that can be contained in the control plane VCN 1916, and the app subnet(s) 1926 can be communicatively coupled to the DB subnet(s) 1930 contained in the control plane data tier 1928 and a service gateway 1936 and a network address translation (NAT) gateway 1938. The control plane VCN 1916 can include the service gateway 1936 and the NAT gateway 1938.

The control plane VCN 1916 can include a data plane mirror app tier 1940 that can include app subnet(s) 1926. The app subnet(s) 1926 contained in the data plane mirror app tier 1940 can include a virtual network interface controller (VNIC) 1942 that can execute a compute instance 1944. The compute instance 1944 can communicatively couple the app subnet(s) 1926 of the data plane mirror app tier 1940 to app subnet(s) 1926 that can be contained in a data plane app tier 1946.

The data plane VCN 1918 can include the data plane app tier 1946, a data plane DMZ tier 1948, and a data plane data tier 1950. The data plane DMZ tier 1948 can include LB subnet(s) 1922 that can be communicatively coupled to the app subnet(s) 1926 of the data plane app tier 1946 and the Internet gateway 1934 of the data plane VCN 1918. The app subnet(s) 1926 can be communicatively coupled to the service gateway 1936 of the data plane VCN 1918 and the NAT gateway 1938 of the data plane VCN 1918. The data plane data tier 1950 can also include the DB subnet(s) 1930 that can be communicatively coupled to the app subnet(s) 1926 of the data plane app tier 1946.

The Internet gateway 1934 of the control plane VCN 1916 and of the data plane VCN 1918 can be communicatively coupled to a metadata management service 1952 that can be communicatively coupled to public Internet 1954. Public Internet 1954 can be communicatively coupled to the NAT gateway 1938 of the control plane VCN 1916 and of the data plane VCN 1918. The service gateway 1936 of the control plane VCN 1916 and of the data plane VCN 1918 can be communicatively couple to cloud services 1956.

In some examples, the service gateway 1936 of the control plane VCN 1916 or of the data plane VCN 1918 can make application programming interface (API) calls to cloud services 1956 without going through public Internet 1954. The API calls to cloud services 1956 from the service gateway 1936 can be one-way: the service gateway 1936 can make API calls to cloud services 1956, and cloud services 1956 can send requested data to the service gateway 1936. But, cloud services 1956 may not initiate API calls to the service gateway 1936.

In some examples, the secure host tenancy 1904 can be directly connected to the service tenancy 1919, which may be otherwise isolated. The secure host subnet 1908 can communicate with the SSH subnet 1914 through an LPG 1910 that may enable two-way communication over an otherwise isolated system. Connecting the secure host subnet 1908 to the SSH subnet 1914 may give the secure host subnet 1908 access to other entities within the service tenancy 1919.

The control plane VCN 1916 may allow users of the service tenancy 1919 to set up or otherwise provision desired resources. Desired resources provisioned in the control plane VCN 1916 may be deployed or otherwise used in the data plane VCN 1918. In some examples, the control plane VCN 1916 can be isolated from the data plane VCN 1918, and the data plane mirror app tier 1940 of the control plane VCN 1916 can communicate with the data plane app tier 1946 of the data plane VCN 1918 via VNICs 1942 that can be contained in the data plane mirror app tier 1940 and the data plane app tier 1946.

In some examples, users of the system, or customers, can make requests, for example create, read, update, or delete (CRUD) operations, through public Internet 1954 that can communicate the requests to the metadata management service 1952. The metadata management service 1952 can communicate the request to the control plane VCN 1916 through the Internet gateway 1934. The request can be received by the LB subnet(s) 1922 contained in the control plane DMZ tier 1920. The LB subnet(s) 1922 may determine that the request is valid, and in response to this determination, the LB subnet(s) 1922 can transmit the request to app subnet(s) 1926 contained in the control plane app tier 1924. If the request is validated and requires a call to public Internet 1954, the call to public Internet 1954 may be transmitted to the NAT gateway 1938 that can make the call to public Internet 1954. Memory that may be desired to be stored by the request can be stored in the DB subnet(s) 1930.

In some examples, the data plane mirror app tier 1940 can facilitate direct communication between the control plane VCN 1916 and the data plane VCN 1918. For example, changes, updates, or other suitable modifications to configuration may be desired to be applied to the resources contained in the data plane VCN 1918. Via a VNIC 1942, the control plane VCN 1916 can directly communicate with, and can thereby execute the changes, updates, or other suitable modifications to configuration to, resources contained in the data plane VCN 1918.

In some embodiments, the control plane VCN 1916 and the data plane VCN 1918 can be contained in the service tenancy 1919. In this case, the user, or the customer, of the system may not own or operate either the control plane VCN 1916 or the data plane VCN 1918. Instead, the IaaS provider may own or operate the control plane VCN 1916 and the data plane VCN 1918, both of which may be contained in the service tenancy 1919. This embodiment can enable isolation of networks that may prevent users or customers from interacting with other users', or other customers', resources. Also, this embodiment may allow users or customers of the system to store databases privately without needing to rely on public Internet 1954, which may not have a desired level of security, for storage.

In other embodiments, the LB subnet(s) 1922 contained in the control plane VCN 1916 can be configured to receive a signal from the service gateway 1936. In this embodiment, the control plane VCN 1916 and the data plane VCN 1918 may be configured to be called by a customer of the IaaS provider without calling public Internet 1954. Customers of the IaaS provider may desire this embodiment since database(s) that the customers use may be controlled by the IaaS provider and may be stored on the service tenancy 1919, which may be isolated from public Internet 1954.

Figure 20:
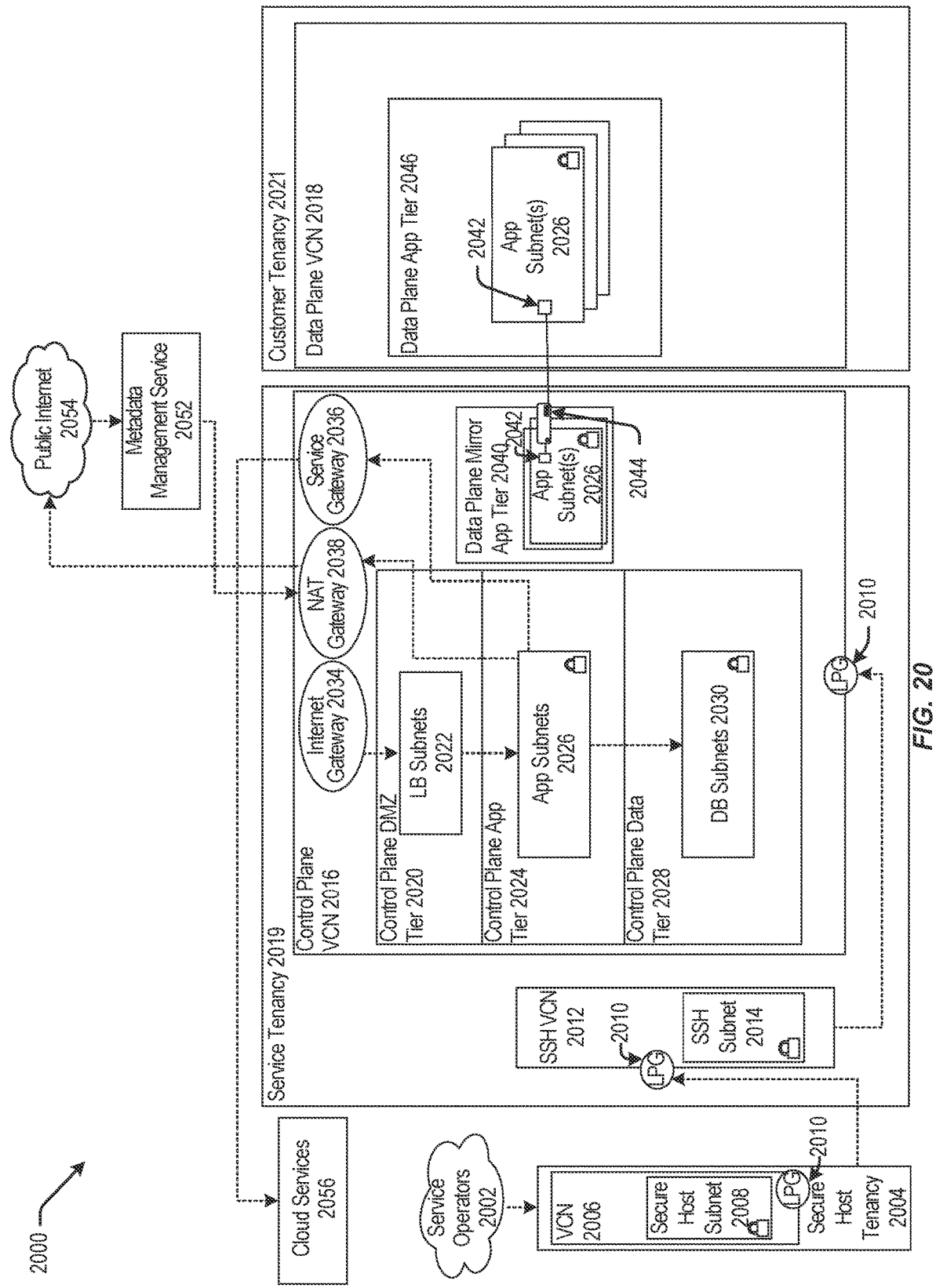
FIG. 20 is a block diagram illustrating another pattern for implementing a cloud infrastructure as a service system, according to at least one embodiment.

FIG. 20 is a block diagram 2000 illustrating another example pattern of an IaaS architecture, according to at least one embodiment. Service operators 2002 (e.g. service operators 1902 of FIG. 19) can be communicatively coupled to a secure host tenancy 2004 (e.g. the secure host tenancy 1904 of FIG. 19) that can include a virtual cloud network (VCN) 2006 (e.g. the VCN 1906 of FIG. 19) and a secure host subnet 2008 (e.g. the secure host subnet 1908 of FIG. 19). The VCN 2006 can include a local peering gateway (LPG) 2010 (e.g. the LPG 1910 of FIG. 19) that can be communicatively coupled to a secure shell (SSH) VCN 2012 (e.g. the SSH VCN 1912 of FIG. 19) via an LPG 1910 contained in the SSH VCN 2012. The SSH VCN 2012 can include an SSH subnet 2014 (e.g. the SSH subnet 1914 of FIG. 19), and the SSH VCN 2012 can be communicatively coupled to a control plane VCN 2016 (e.g. the control plane VCN 1916 of FIG. 19) via an LPG 2010 contained in the control plane VCN 2016. The control plane VCN 2016 can be contained in a service tenancy 2019 (e.g. the service tenancy 1919 of FIG. 19), and the data plane VCN 2018 (e.g. the data plane VCN 1918 of FIG. 19) can be contained in a customer tenancy 2021 that may be owned or operated by users, or customers, of the system.

The control plane VCN 2016 can include a control plane DMZ tier 2020 (e.g. the control plane DMZ tier 1920 of FIG. 19) that can include LB subnet(s) 2022 (e.g. LB subnet(s) 1922 of FIG. 19), a control plane app tier 2024 (e.g. the control plane app tier 1924 of FIG. 19) that can include app subnet(s) 2026 (e.g. app subnet(s) 1926 of FIG. 19), a control plane data tier 2028 (e.g. the control plane data tier 1928 of FIG. 19) that can include database (DB) subnet(s) 2030 (e.g. similar to DB subnet(s) 1930 of FIG. 19). The LB subnet(s) 2022 contained in the control plane DMZ tier 2020 can be communicatively coupled to the app subnet(s) 2026 contained in the control plane app tier 2024 and an Internet gateway 2034 (e.g. the Internet gateway 1934 of FIG. 19) that can be contained in the control plane VCN 2016, and the app subnet(s) 2026 can be communicatively coupled to the DB subnet(s) 2030 contained in the control plane data tier 2028 and a service gateway 2036 (e.g. the service gateway of FIG. 19) and a network address translation (NAT) gateway 2038 (e.g. the NAT gateway 1938 of FIG. 19). The control plane VCN 2016 can include the service gateway 2036 and the NAT gateway 2038.

The control plane VCN 2016 can include a data plane mirror app tier 2040 (e.g. the data plane mirror app tier 1940 of FIG. 19) that can include app subnet(s) 2026. The app subnet(s) 2026 contained in the data plane mirror app tier 2040 can include a virtual network interface controller (VNIC) 2042 (e.g. the VNIC of 1942) that can execute a compute instance 2044 (e.g. similar to the compute instance 1944 of FIG. 19). The compute instance 2044 can facilitate communication between the app subnet(s) 2026 of the data plane mirror app tier 2040 and the app subnet(s) 2026 that can be contained in a data plane app tier 2046 (e.g. the data plane app tier 1946 of FIG. 19) via the VNIC 2042 contained in the data plane mirror app tier 2040 and the VNIC 2042 contained in the data plane app tier 2046.

The Internet gateway 2034 contained in the control plane VCN 2016 can be communicatively coupled to a metadata management service 2052 (e.g. the metadata management service 1952 of FIG. 19) that can be communicatively coupled to public Internet 2054 (e.g. public Internet 1954 of FIG. 19). Public Internet 2054 can be communicatively coupled to the NAT gateway 2038 contained in the control plane VCN 2016. The service gateway 2036 contained in the control plane VCN 2016 can be communicatively couple to cloud services 2056 (e.g. cloud services 1956 of FIG. 19).

In some examples, the data plane VCN 2018 can be contained in the customer tenancy 2021. In this case, the IaaS provider may provide the control plane VCN 2016 for each customer, and the IaaS provider may, for each customer, set up a unique compute instance 2044 that is contained in the service tenancy 2019. Each compute instance 2044 may allow communication between the control plane VCN 2016, contained in the service tenancy 2019, and the data plane VCN 2018 that is contained in the customer tenancy 2021. The compute instance 2044 may allow resources, that are provisioned in the control plane VCN 2016 that is contained in the service tenancy 2019, to be deployed or otherwise used in the data plane VCN 2018 that is contained in the customer tenancy 2021.

In other examples, the customer of the IaaS provider may have databases that live in the customer tenancy 2021. In this example, the control plane VCN 2016 can include the data plane mirror app tier 2040 that can include app subnet (s) 2026. The data plane mirror app tier 2040 can reside in the data plane VCN 2018, but the data plane mirror app tier 2040 may not live in the data plane VCN 2018. That is, the data plane mirror app tier 2040 may have access to the customer tenancy 2021, but the data plane mirror app tier 2040 may not exist in the data plane VCN 2018 or be owned or operated by the customer of the IaaS provider. The data plane mirror app tier 2040 may be configured to make calls to the data plane VCN 2018 but may not be configured to make calls to any entity contained in the control plane VCN 2016. The customer may desire to deploy or otherwise use resources in the data plane VCN 2018 that are provisioned in the control plane VCN 2016, and the data plane mirror app tier 2040 can facilitate the desired deployment, or other usage of resources, of the customer.

In some embodiments, the customer of the IaaS provider can apply filters to the data plane VCN 2018. In this embodiment, the customer can determine what the data plane VCN 2018 can access, and the customer may restrict access to public Internet 2054 from the data plane VCN 2018. The IaaS provider may not be able to apply filters or otherwise control access of the data plane VCN 2018 to any outside networks or databases. Applying filters and controls by the customer onto the data plane VCN 2018, contained in the customer tenancy 2021, can help isolate the data plane VCN 2018 from other customers and from public Internet 2054.

In some embodiments, cloud services 2056 can be called by the service gateway 2036 to access services that may not exist on public Internet 2054, on the control plane VCN 2016, or on the data plane VCN 2018. The connection between cloud services 2056 and the control plane VCN 2016 or the data plane VCN 2018 may not be live or continuous. Cloud services 2056 may exist on a different network owned or operated by the IaaS provider. Cloud services 2056 may be configured to receive calls from the service gateway 2036 and may be configured to not receive calls from public Internet 2054. Some cloud services 2056 may be isolated from other cloud services 2056, and the control plane VCN 2016 may be isolated from cloud services 2056 that may not be in the same region as the control plane VCN 2016. For example, the control plane VCN 2016 may be located in "Region 1," and cloud service "Deployment 19," may be located in Region 1 and in "Region 2." If a call to Deployment 19 is made by the service gateway 2036 contained in the control plane VCN 2016 located in Region 1, the call may be transmitted to Deployment 19 in Region 1. In this example, the control plane VCN 2016, or Deployment 19 in Region 1, may not be communicatively coupled to, or otherwise in communication with, Deployment 19 in Region 2.

Figure 21:
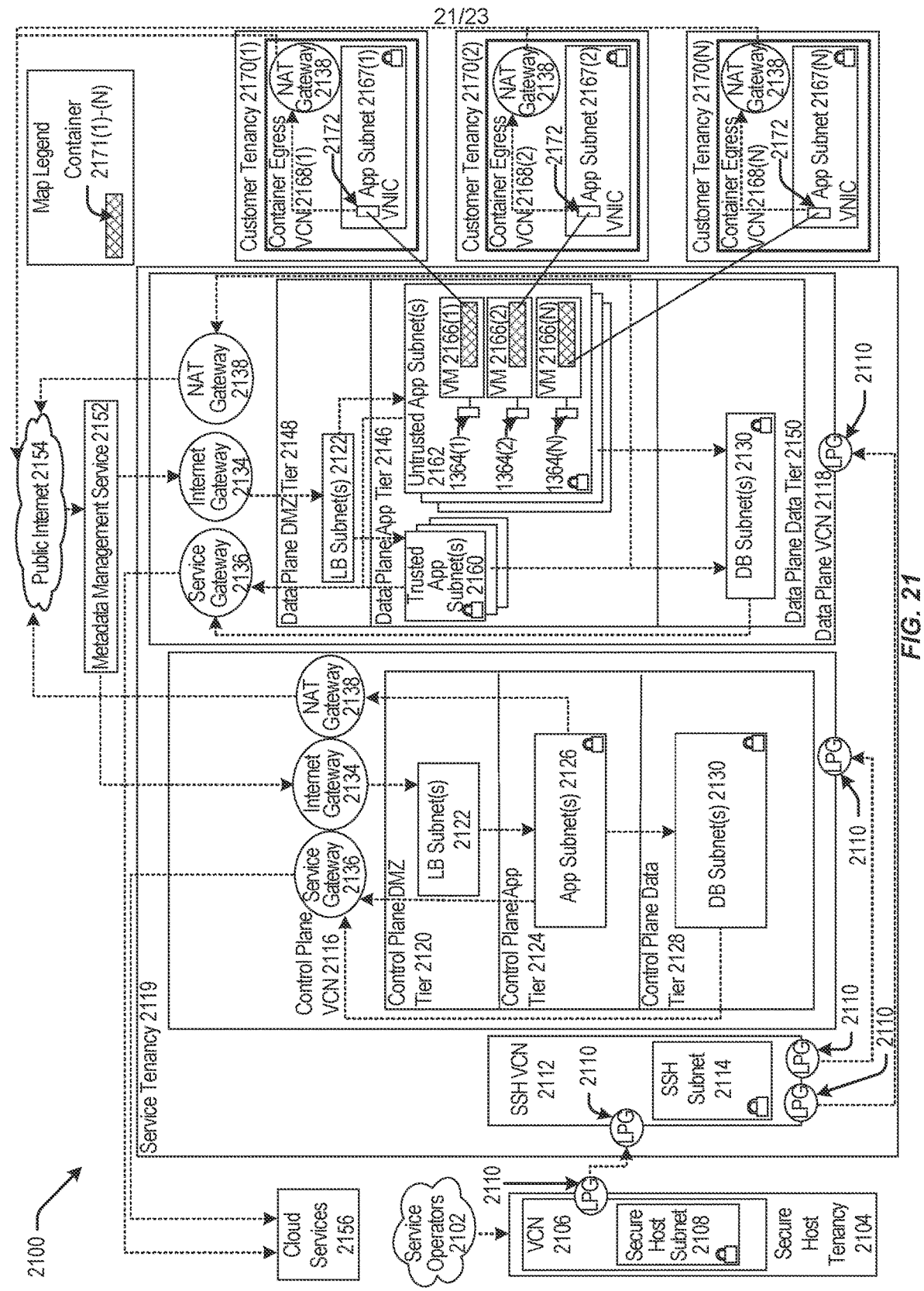
FIG. 21 is a block diagram illustrating another pattern for implementing a cloud infrastructure as a service system, according to at least one embodiment.

FIG. 21 is a block diagram 2100 illustrating another example pattern of an IaaS architecture, according to at least one embodiment. Service operators 2102 (e.g. service operators 1902 of FIG. 19) can be communicatively coupled to a secure host tenancy 2104 (e.g. the secure host tenancy 1904 of FIG. 19) that can include a virtual cloud network (VCN) 2106 (e.g. the VCN 1906 of FIG. 19) and a secure host subnet 2108 (e.g. the secure host subnet 1908 of FIG. 19). The VCN 2106 can include an LPG 2110 (e.g. the LPG 1910 of FIG. 19) that can be communicatively coupled to an SSH VCN 2112 (e.g. the SSH VCN 1912 of FIG. 19) via an LPG 2110 contained in the SSH VCN 2112. The SSH VCN 2112 can include an SSH subnet 2114 (e.g. the SSH subnet 1914 of FIG. 19), and the SSH VCN 2112 can be communicatively coupled to a control plane VCN 2116 (e.g. the control plane VCN 1916 of FIG. 19) via an LPG 2110 contained in the control plane VCN 2116 and to a data plane VCN 2118

(e.g. the data plane 1918 of FIG. 19) via an LPG 2110 contained in the data plane VCN 2118. The control plane VCN 2116 and the data plane VCN 2118 can be contained in a service tenancy 2119 (e.g. the service tenancy 1919 of FIG. 19).

The control plane VCN 2116 can include a control plane DMZ tier 2120 (e.g. the control plane DMZ tier 1920 of FIG. 19) that can include load balancer (LB) subnet(s) 2122 (e.g. LB subnet(s) 1922 of FIG. 19), a control plane app tier 2124 (e.g. the control plane app tier 1924 of FIG. 19) that can include app subnet(s) 2126 (e.g. similar to app subnet(s) 1926 of FIG. 19), a control plane data tier 2128 (e.g. the control plane data tier 1928 of FIG. 19) that can include DB subnet(s) 2130. The LB subnet(s) 2122 contained in the control plane DMZ tier 2120 can be communicatively coupled to the app subnet(s) 2126 contained in the control plane app tier 2124 and to an Internet gateway 2134 (e.g. the Internet gateway 1934 of FIG. 19) that can be contained in the control plane VCN 2116, and the app subnet(s) 2126 can be communicatively coupled to the DB subnet(s) 2130 contained in the control plane data tier 2128 and to a service gateway 2136 (e.g. the service gateway of FIG. 19) and a network address translation (NAT) gateway 2138 (e.g. the NAT gateway 1938 of FIG. 19). The control plane VCN 2116 can include the service gateway 2136 and the NAT gateway 2138.

The data plane VCN 2118 can include a data plane app tier 2146 (e.g. the data plane app tier 1946 of FIG. 19), a data plane DMZ tier 2148 (e.g. the data plane DMZ tier 1948 of FIG. 19), and a data plane data tier 2150 (e.g. the data plane data tier 1950 of FIG. 19). The data plane DMZ tier 2148 can include LB subnet(s) 2122 that can be communicatively coupled to trusted app subnet(s) 2160 and untrusted app subnet(s) 2162 of the data plane app tier 2146 and the Internet gateway 2134 contained in the data plane VCN 2118. The trusted app subnet(s) 2160 can be communicatively coupled to the service gateway 2136 contained in the data plane VCN 2118, the NAT gateway 2138 contained in the data plane VCN 2118, and DB subnet(s) 2130 contained in the data plane data tier 2150. The untrusted app subnet(s) 2162 can be communicatively coupled to the service gateway 2136 contained in the data plane VCN 2118 and DB subnet(s) 2130 contained in the data plane data tier 2150. The data plane data tier 2150 can include DB subnet(s) 2130 that can be communicatively coupled to the service gateway 2136 contained in the data plane VCN 2118.

The untrusted app subnet(s) 2162 can include one or more primary VNICs 2164(1)-(N) that can be communicatively coupled to tenant virtual machines (VMs) 2166(1)-(N). Each tenant VM 2166(1)-(N) can be communicatively coupled to a respective app subnet 2167(1)-(N) that can be contained in respective container egress VCNs 2168(1)-(N) that can be contained in respective customer tenancies 2170(1)-(N). Respective secondary VNICs 2172(1)-(N) can facilitate communication between the untrusted app subnet(s) 2162 contained in the data plane VCN 2118 and the app subnet contained in the container egress VCNs 2168(1)-(N). Each container egress VCNs 2168(1)-(N) can include a NAT gateway 2138 that can be communicatively coupled to public Internet 2154 (e.g. public Internet 1954 of FIG. 19).

The Internet gateway 2134 contained in the control plane VCN 2116 and contained in the data plane VCN 2118 can be communicatively coupled to a metadata management service 2152 (e.g. the metadata management system 1952 of FIG. 19) that can be communicatively coupled to public Internet 2154. Public Internet 2154 can be communicatively coupled to the NAT gateway 2138 contained in the control plane VCN 2116 and contained in the data plane VCN 2118. The service gateway 2136 contained in the control plane VCN 2116 and contained in the data plane VCN 2118 can be communicatively couple to cloud services 2156.

In some embodiments, the data plane VCN 2118 can be integrated with customer tenancies 2170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 2146. Code to run the function may be executed in the VMs 2166(1)-(N), and the code may not be configured to run anywhere else on the data plane VCN 2118. Each VM 2166(1)-(N) may be connected to one customer tenancy 2170. Respective containers 2171(1)-(N) contained in the VMs 2166(1)-(N) may be configured to run the code. In this case, there can be a dual isolation (e.g., the containers 2171(1)-(N) running code, where the containers 2171(1)-(N) may be contained in at least the VM 2166(1)-(N) that are contained in the untrusted app subnet(s) 2162), which may help prevent incorrect or otherwise undesirable code from damaging the network of the IaaS provider or from damaging a network of a different customer. The containers 2171(1)-(N) may be communicatively coupled to the customer tenancy 2170 and may be configured to transmit or receive data from the customer tenancy 2170. The containers 2171(1)-(N) may not be configured to transmit or receive data from any other entity in the data plane VCN 2118. Upon completion of running the code, the IaaS provider may kill or otherwise dispose of the containers 2171(1)-(N).

In some embodiments, the trusted app subnet(s) 2160 may run code that may be owned or operated by the IaaS provider. In this embodiment, the trusted app subnet(s) 2160 may be communicatively coupled to the DB subnet(s) 2130 and be configured to execute CRUD operations in the DB subnet(s) 2130. The untrusted app subnet(s) 2162 may be communicatively coupled to the DB subnet(s) 2130, but in this embodiment, the untrusted app subnet(s) may be configured to execute read operations in the DB subnet(s) 2130. The containers 2171(1)-(N) that can be contained in the VM 2166(1)-(N) of each customer and that may run code from the customer may not be communicatively coupled with the DB subnet(s) 2130.

In other embodiments, the control plane VCN 2116 and the data plane VCN 2118 may not be directly communicatively coupled. In this embodiment, there may be no direct communication between the control plane VCN 2116 and the data plane VCN 2118. However, communication can occur indirectly through at least one method. An LPG 2110 may be established by the IaaS provider that can facilitate communication between the control plane VCN 2116 and the data plane VCN 2118. In another example, the control plane VCN 2116 or the data plane VCN 2118 can make a call to cloud services 2156 via the service gateway 2136. For example, a call to cloud services 2156 from the control plane VCN 2116 can include a request for a service that can communicate with the data plane VCN 2118.

Figure 22:
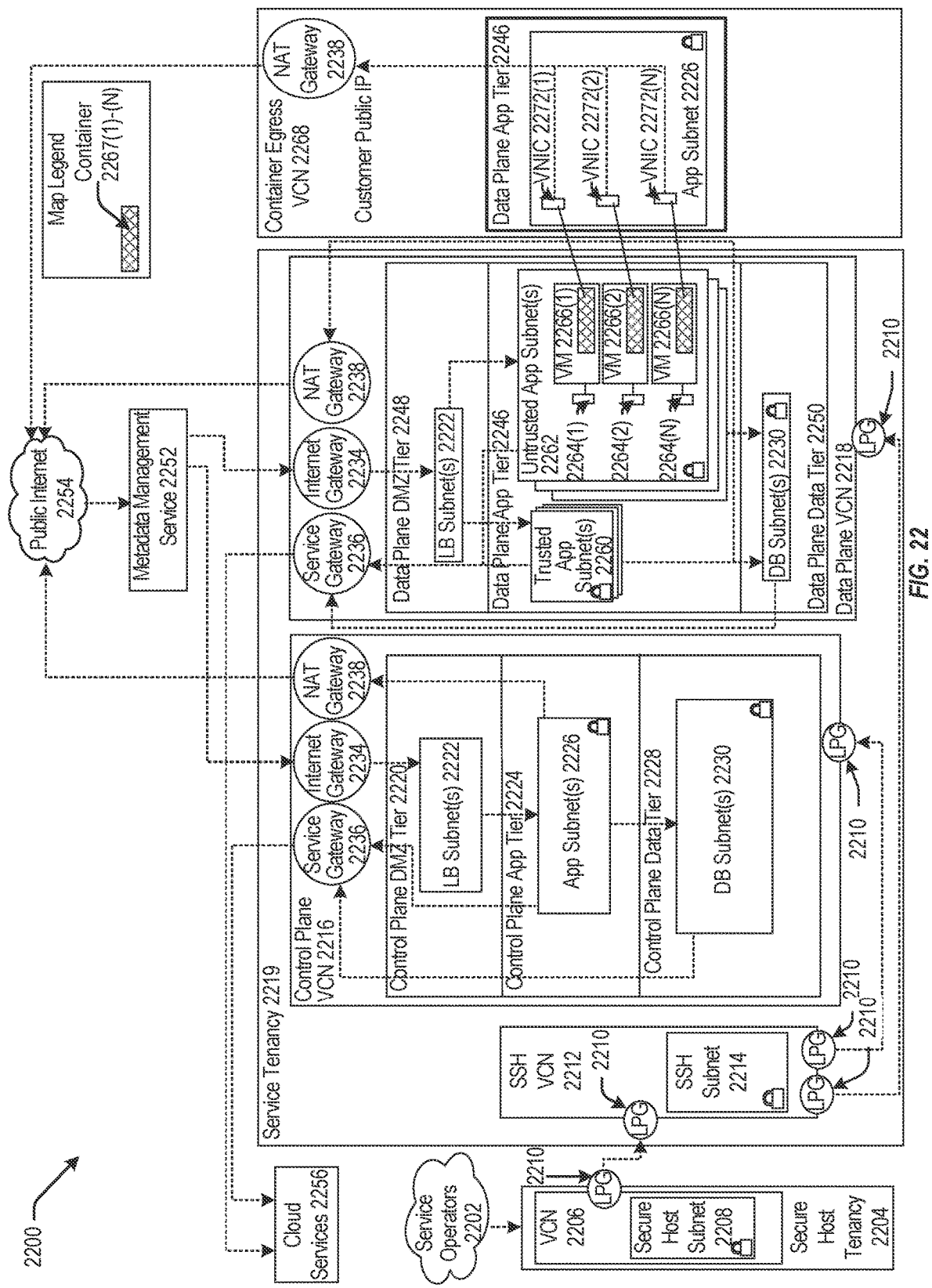
FIG. 22 is a block diagram illustrating another pattern for implementing a cloud infrastructure as a service system, according to at least one embodiment.

FIG. 22 is a block diagram 2200 illustrating another example pattern of an IaaS architecture, according to at least one embodiment. Service operators 2202 (e.g. service operators 1902 of FIG. 19) can be communicatively coupled to a secure host tenancy 2204 (e.g. the secure host tenancy 1904 of FIG. 19) that can include a virtual cloud network (VCN) 2206 (e.g. the VCN 1906 of FIG. 19) and a secure host subnet 2208 (e.g. the secure host subnet 1908 of FIG. 19). The VCN 2206 can include an LPG 2210 (e.g. the LPG 1910 of FIG. 19) that can be communicatively coupled to an SSH VCN 2212 (e.g. the SSH VCN 1912 of FIG. 19) via an LPG 2210 contained in the SSH VCN 2212. The SSH VCN 2212 can include an SSH subnet 2214 (e.g. the SSH subnet 1914 of FIG. 19), and the SSH VCN 2212 can be communicatively coupled to a control plane VCN 2216 (e.g. the control plane VCN 1916 of FIG. 19) via an LPG 2210 contained in the control plane VCN 2216 and to a data plane VCN 2218 (e.g. the data plane 1918 of FIG. 19) via an LPG 2210 contained in the data plane VCN 2218. The control plane VCN 2216 and the data plane VCN 2218 can be contained in a service tenancy 2219 (e.g. the service tenancy 1919 of FIG. 19).

The control plane VCN 2216 can include a control plane DMZ tier 2220 (e.g. the control plane DMZ tier 1920 of FIG. 19) that can include LB subnet(s) 2222 (e.g. LB subnet(s) 1922 of FIG. 19), a control plane app tier 2224 (e.g. the control plane app tier 1924 of FIG. 19) that can include app subnet(s) 2226 (e.g. app subnet(s) 1926 of FIG. 19), a control plane data tier 2228 (e.g. the control plane data tier 1928 of FIG. 19) that can include DB subnet(s) 2230 (e.g. DB subnet(s) 2130 of FIG. 21). The LB subnet(s) 2222 contained in the control plane DMZ tier 2220 can be communicatively coupled to the app subnet(s) 2226 contained in the control plane app tier 2224 and to an Internet gateway 2234 (e.g. the Internet gateway 1934 of FIG. 19) that can be contained in the control plane VCN 2216, and the app subnet(s) 2226 can be communicatively coupled to the DB subnet(s) 2230 contained in the control plane data tier 2228 and to a service gateway 2236 (e.g. the service gateway of FIG. 19) and a network address translation (NAT) gateway 2238 (e.g. the NAT gateway 1938 of FIG. 19). The control plane VCN 2216 can include the service gateway 2236 and the NAT gateway 2238.

The data plane VCN 2218 can include a data plane app tier 2246 (e.g. the data plane app tier 1946 of FIG. 19), a data plane DMZ tier 2248 (e.g. the data plane DMZ tier 1948 of FIG. 19), and a data plane data tier 2250 (e.g. the data plane data tier 1950 of FIG. 19). The data plane DMZ tier 2248 can include LB subnet(s) 2222 that can be communicatively coupled to trusted app subnet(s) 2260 (e.g. trusted app subnet(s) 2160 of FIG. 21) and untrusted app subnet(s) 2262 (e.g. untrusted app subnet(s) 2162 of FIG. 21) of the data plane app tier 2246 and the Internet gateway 2234 contained in the data plane VCN 2218. The trusted app subnet(s) 2260 can be communicatively coupled to the service gateway 2236 contained in the data plane VCN 2218, the NAT gateway 2238 contained in the data plane VCN 2218, and DB subnet(s) 2230 contained in the data plane data tier 2250. The untrusted app subnet(s) 2262 can be communicatively coupled to the service gateway 2236 contained in the data plane VCN 2218 and DB subnet(s) 2230 contained in the data plane data tier 2250. The data plane data tier 2250 can include DB subnet(s) 2230 that can be communicatively coupled to the service gateway 2236 contained in the data plane VCN 2218.

The untrusted app subnet(s) 2262 can include primary VNICs 2264(1)-(N) that can be communicatively coupled to tenant virtual machines (VMs) 2266(1)-(N) residing within the untrusted app subnet(s) 2262. Each tenant VM 2266(1)-(N) can run code in a respective container 2267(1)-(N), and be communicatively coupled to an app subnet 2226 that can be contained in a data plane app tier 2246 that can be contained in a container egress VCN 2268. Respective secondary VNICs 2272(1)-(N) can facilitate communication between the untrusted app subnet(s) 2262 contained in the data plane VCN 2218 and the app subnet contained in the container egress VCN 2268. The container egress VCN can include a NAT gateway 2238 that can be communicatively coupled to public Internet 2254 (e.g. public Internet 1954 of FIG. 19).

The Internet gateway 2234 contained in the control plane VCN 2216 and contained in the data plane VCN 2218 can be communicatively coupled to a metadata management service 2252 (e.g. the metadata management system 1952 of FIG. 19) that can be communicatively coupled to public Internet 2254. Public Internet 2254 can be communicatively coupled to the NAT gateway 2238 contained in the control plane VCN 2216 and contained in the data plane VCN 2218. The service gateway 2236 contained in the control plane VCN 2216 and contained in the data plane VCN 2218 can be communicatively couple to cloud services 2256.

In some examples, the pattern illustrated by the architecture of block diagram 2200 of FIG. 22 may be considered an exception to the pattern illustrated by the architecture of block diagram 2100 of FIG. 21 and may be desirable for a customer of the IaaS provider if the IaaS provider cannot directly communicate with the customer (e.g., a disconnected region). The respective containers 2267(1)-(N) that are contained in the VMs 2266(1)-(N) for each customer can be accessed in real-time by the customer. The containers 2267(1)-(N) may be configured to make calls to respective secondary VNICs 2272(1)-(N) contained in app subnet(s) 2226 of the data plane app tier 2246 that can be contained in the container egress VCN 2268. The secondary VNICs 2272(1)-(N) can transmit the calls to the NAT gateway 2238 that may transmit the calls to public Internet 2254. In this example, the containers 2267(1)-(N) that can be accessed in real-time by the customer can be isolated from the control plane VCN 2216 and can be isolated from other entities contained in the data plane VCN 2218. The containers 2267(1)-(N) may also be isolated from resources from other customers.

In other examples, the customer can use the containers 2267(1)-(N) to call cloud services 2256. In this example, the customer may run code in the containers 2267(1)-(N) that requests a service from cloud services 2256. The containers 2267(1)-(N) can transmit this request to the secondary VNICs 2272(1)-(N) that can transmit the request to the NAT gateway that can transmit the request to public Internet 2254. Public Internet 2254 can transmit the request to LB subnet(s) 2222 contained in the control plane VCN 2216 via the Internet gateway 2234. In response to determining the request is valid, the LB subnet(s) can transmit the request to app subnet(s) 2226 that can transmit the request to cloud services 2256 via the service gateway 2236.

It should be appreciated that IaaS architectures 1900, 2000, 2100, 2200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 23:
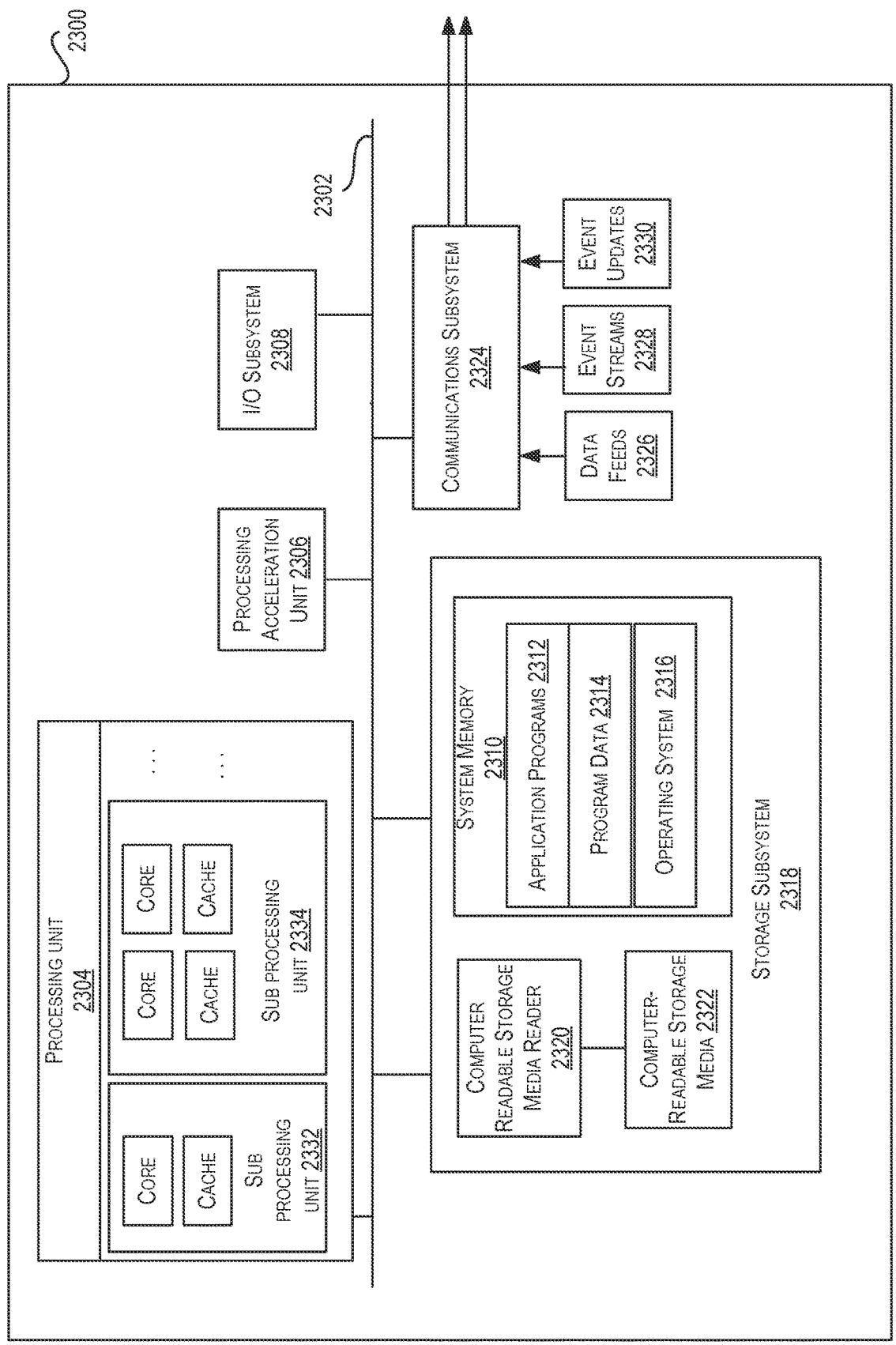
FIG. 23 is a block diagram illustrating an example computer system, according to at least one embodiment.

FIG. 23 illustrates an example computer system 2300, in which various embodiments may be implemented. The system 2300 may be used to implement any of the computer systems described above. As shown in the figure, computer system 2300 includes a processing unit 2304 that communicates with a number of peripheral subsystems via a bus subsystem 2302. These peripheral subsystems may include a processing acceleration unit 2306, an I/O subsystem 2308, a storage subsystem 2318 and a communications subsystem 2324. Storage subsystem 2318 includes tangible computer-readable storage media 2322 and a system memory 2310.

Bus subsystem 2302 provides a mechanism for letting the various components and subsystems of computer system 2300 communicate with each other as intended. Although bus subsystem 2302 is shown schematically as a single bus, alternative embodiments of the bus subsystem may utilize multiple buses. Bus subsystem 2302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2304, which can be implemented as one or more integrated circuits (e.g., a conventional microprocessor or microcontroller), controls the operation of computer system 2300. One or more processors may be included in processing unit 2304. These processors may include single core or multicore processors. In certain embodiments, processing unit 2304 may be implemented as one or more independent processing units 2332 and/or 2334 with single or multicore processors included in each processing unit. In other embodiments, processing unit 2304 may also be implemented as a quad-core processing unit formed by integrating two dual-core processors into a single chip.

In various embodiments, processing unit 2304 can execute a variety of programs in response to program code and can maintain multiple concurrently executing programs or processes. At any given time, some or all of the program code to be executed can be resident in processor(s) 2304 and/or in storage subsystem 2318. Through suitable programming, processor(s) 2304 can provide various functionalities described above. Computer system 2300 may additionally include a processing acceleration unit 2306, which can include a digital signal processor (DSP), a special-purpose processor, and/or the like.

I/O subsystem 2308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2300 may comprise a storage subsystem 2318 that comprises software elements, shown as being currently located within a system memory 2310. System memory 2310 may store program instructions that are loadable and executable on processing unit 2304, as well as data generated during the execution of these programs.

Depending on the configuration and type of computer system 2300, system memory 2310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2304. In some implementations, system memory 2310 may include multiple different types of memory, such as static random access memory (SRAM) or dynamic random access memory (DRAM). In some implementations, a basic input/output system (BIOS), containing the basic routines that help to transfer information between elements within computer system 2300, such as during start-up, may typically be stored in the ROM. By way of example, and not limitation, system memory 2310 also illustrates application programs 2312, which may include client applications, Web browsers, mid-tier applications, relational database management systems (RDBMS), etc., program data 2314, and an operating system 2316. By way of example, operating system 2316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 23 OS, and Palm® OS operating systems.

Storage subsystem 2318 may also provide a tangible computer-readable storage medium for storing the basic programming and data constructs that provide the functionality of some embodiments. Software (programs, code modules, instructions) that when executed by a processor provide the functionality described above may be stored in storage subsystem 2318. These software modules or instructions may be executed by processing unit 2304. Storage subsystem 2318 may also provide a repository for storing data used in accordance with the present disclosure.

Storage subsystem 2300 may also include a computer-readable storage media reader 2320 that can further be connected to computer-readable storage media 2322. Together and, optionally, in combination with system memory 2310, computer-readable storage media 2322 may comprehensively represent remote, local, fixed, and/or removable storage devices plus storage media for temporarily and/or more permanently containing, storing, transmitting, and retrieving computer-readable information.

Computer-readable storage media 2322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2300.

By way of example, computer-readable storage media 2322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2322 may include, but is not limited to, Zip® drives, flash memory cards, universal serial bus (USB) flash drives, secure digital (SD) cards, DVD disks, digital video tape, and the like. Computer-readable storage media 2322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2300.

Communications subsystem 2324 provides an interface to other computer systems and networks. Communications subsystem 2324 serves as an interface for receiving data from and transmitting data to other systems from computer system 2300. For example, communications subsystem 2324 may enable computer system 2300 to connect to one or more devices via the Internet. In some embodiments communications subsystem 2324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2324 can provide wired network connectivity (e.g., Ethernet) in addition to or instead of a wireless interface.

In some embodiments, communications subsystem 2324 may also receive input communication in the form of structured and/or unstructured data feeds 2326, event streams 2328, event updates 2330, and the like on behalf of one or more users who may use computer system 2300.

By way of example, communications subsystem 2324 may be configured to receive data feeds 2326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2324 may also be configured to receive data in the form of continuous data streams, which may include event streams 2328 of real-time events and/or event updates 2330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2324 may also be configured to output the structured and/or unstructured data feeds 2326, event streams 2328, event updates 2330, and the like to one or more databases that may be in communication with one or more streaming data source computers coupled to computer system 2300.

Computer system 2300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for sharing bandwidth on a smart network interface card, the method comprising:
   receiving, by one or more processors of the smart network interface card, first traffic for a first process associated with a first bandwidth limit, the first bandwidth limit corresponding to a sum of a first transmit limit and a first receive limit associated with the first process, wherein a subset of the first traffic is received through a pipeline controlled by a rate limiter that limits pipeline traffic based at least in part on one or more bandwidth limits corresponding to the first process;
   receiving, by the one or more processors of the smart network interface card, second traffic for a second process associated with a second bandwidth limit, the second bandwidth limit corresponding to half the sum of a second transmit limit and a second receive limit associated with the second process;
   queuing, by the one or more processors of the smart network interface card, the first traffic for the first process and the second traffic for the second process in a scheduler, the scheduler having a first set of queues that store the first traffic for the first process, and a second set of queues that store the second traffic for the second process; and
   forwarding, by the one or more processors of the smart network interface card, queued traffic from at least one of the first set of queues or the second set of queues, a maximum amount of forwarded first process traffic corresponding to the first bandwidth limit minus an amount of forwarded second process traffic.

2. The method of claim 1, wherein the queued traffic is forwarded according to a fair weighted round robin algorithm, where forwarded packets are assigned a weight corresponding to a packet size.

3. The method of claim 1, wherein the first process comprises one or more subprocesses and the second process comprises one or more subprocesses.

4. The method of claim 1, wherein the one or more bandwidth limits with which the rate limits the pipeline traffic comprises a first global limit for traffic from the first process.

5. The method of claim 1, wherein the subset of the first traffic includes a first communication sent to open a connection with the first process and a second communication sent to close the connection with the first process.

6. The method of claim 1, wherein the rate limiter limits the subset of the first traffic using a subset bandwidth limit.

7. The method of claim 1, wherein the rate limiter is a first rate limiter, wherein the second traffic received from the second process is controlled by a second rate limiter that limits traffic based at least in part on one or more additional bandwidth limits, the one or more additional bandwidth limits comprising a second global limit for traffic from the second process.

8. A non-transitory computer-readable storage medium storing a set of instructions, that, when executed by one or more processors of a smart network interface card, cause the one or more processors to perform instructions comprising:
receiving first traffic for a first process associated with a first bandwidth limit, the first bandwidth limit corresponding to a sum of a first transmit limit and a first receive limit associated with the first process, wherein a subset of the first traffic is received through a pipeline controlled by a rate limiter that limits pipeline traffic based at least in part on one or more bandwidth limits corresponding to the first process;
receiving second traffic for a second process associated with a second bandwidth limit, the second bandwidth limit corresponding to half the sum of a second transmit limit and a second receive limit associated with the second process;
queuing the first traffic for the first process and the second traffic for the second process in a scheduler, the scheduler having a first set of queues that store the first traffic for the first process, and a second set of queues that store the second traffic for the second process; and
forwarding queued traffic from at least one of the first set of queues or the second set of queues, a maximum amount of forwarded first process traffic corresponding to the first bandwidth limit minus an amount of forwarded second process traffic.

9. The non-transitory computer-readable storage medium of claim 8, wherein the queued traffic is forwarded according to a fair weighted round robin algorithm, where forwarded packets are assigned a weight corresponding to a packet size.

10. The non-transitory computer-readable storage medium of claim 8, wherein the first process comprises one or more subprocesses and the second process comprises one or more subprocesses.

11. The non-transitory computer-readable storage medium of claim 8, wherein the one or more bandwidth limits with which the rate limiter limits the pipeline traffic comprises a first global limit for traffic from the first process.

12. The non-transitory computer-readable storage medium of claim 11, wherein the subset of the first traffic includes a first communication sent to open a connection with the first process and a second communication sent to close the connection with the first process.

13. The non-transitory computer-readable storage medium of claim 12, wherein the rate limiter limits the subset of the first traffic using a subset bandwidth limit.

14. The non-transitory computer-readable storage medium of claim 8, wherein the rate limiter is a first rate limiter, wherein the second traffic received from the second process is controlled by a second rate limiter that limits traffic based at least in part on one or more additional bandwidth limits, the one or more additional bandwidth limits comprising a second global limit for traffic from the second process.

15. A smart network interface card, comprising:
memory storing computer-executable instructions; and
one or more processors configured to access the memory, and execute the computer-executable instructions to at least:
receive first traffic for a first process associated with a first bandwidth limit, the first bandwidth limit corresponding to a sum of a first transmit limit and a first receive limit associated with the first process, wherein a subset of the first traffic is received through a pipeline controlled by a rate limiter that limits pipeline traffic based at least in part on one or more bandwidth limits corresponding to the first process;
receive second traffic for a second process associated with a second bandwidth limit, the second bandwidth limit corresponding to half the sum of a second transmit limit and a second receive limit associated with the second process;
queue the first traffic for the first process and the second traffic for the second process in a scheduler, the scheduler having a first set of queues that store the first traffic for the first process, and a second set of queues that store the second traffic for the second process; and
forward queued traffic from at least one of the first set of queues or the second set of queues, a maximum amount of forwarded first process traffic corresponding to the first bandwidth limit minus an amount of forwarded second process traffic.

16. The smart network interface card (smartNIC) of claim 15, wherein the queued traffic is forwarded according to a fair weighted round robin algorithm, where forwarded packets are assigned a weight corresponding to a packet size.

17. The smart network interface card (smartNIC) of claim 15, wherein the first process comprises one or more subprocesses and the second process comprises one or more subprocesses.

18. The smart network interface card (smartNIC) of claim 15, wherein the one or more bandwidth limits with which the rate limiter limits the pipeline traffic comprises a first global limit for traffic from the first process.

19. The smart network interface card (smartNIC) of claim 18, wherein the subset of the first traffic includes a first communication sent to open a connection with the first process and a second communication sent to close the connection with the first process.

20. The smart network interface card (smartNIC) of claim 19, wherein the rate limiter is a first rate limiter, wherein the second traffic received from the second process is controlled by a second rate limiter that limits traffic based at least in part on one or more additional bandwidth limits, the one or more additional bandwidth limits comprising a second global limit for the second traffic received from the second process.

* * * * *